US007078130B2

(12) United States Patent
Antonelli

(10) Patent No.: US 7,078,130 B2
(45) Date of Patent: Jul. 18, 2006

(54) METALLIC MESOPOROUS TRANSITION METAL OXIDE MOLECULAR SIEVES, ROOM TEMPERATURE ACTIVATION OF DINITROGEN AND AMMONIA PRODUCTION

(75) Inventor: David M. Antonelli, Windsor (CA)

(73) Assignee: University of Windsor, Windsor (CA)

( * ) Notice: Subject to any disclaimer, the term of this patent is extended or adjusted under 35 U.S.C. 154(b) by 407 days.

(21) Appl. No.: 10/302,987

(22) Filed: Nov. 25, 2002

(65) Prior Publication Data

US 2004/0077493 A1 Apr. 22, 2004

(30) Foreign Application Priority Data

Oct. 17, 2002 (CA) .................................. 2404830

(51) Int. Cl.
*B01J 21/00* (2006.01)
*B01J 23/20* (2006.01)
*C01C 1/04* (2006.01)

(52) U.S. Cl. ...................... 429/304; 206/0.7; 208/121; 208/213; 208/216 R; 208/217; 252/1; 423/351; 423/359; 423/651; 423/652; 423/659; 502/302; 502/305; 502/308; 502/309; 502/311; 502/313; 502/315; 502/316; 502/317; 502/319; 502/321; 502/324; 502/325; 502/326; 502/328; 502/330; 502/337; 502/338; 502/339; 502/340; 502/344; 502/345; 502/349; 502/350; 502/353; 540/1; 568/420; 585/266; 585/269; 585/270; 585/271; 585/273; 585/274; 585/275; 585/276; 585/375; 585/467; 585/721; 588/406

(58) Field of Classification Search ................ 429/304; 206/0.7; 208/121, 213, 216 R, 217; 252/1; 423/351, 359, 651, 652, 659; 502/302, 305, 502/308, 309, 311, 313, 315, 316, 317, 319, 502/321, 324, 325, 326, 328, 330, 337, 338, 502/339, 340, 344, 345, 349, 350, 353; 540/1; 568/420; 585/266, 269, 270, 271, 273, 274, 585/275, 276, 375, 467, 721; 588/406
See application file for complete search history.

(56) References Cited

U.S. PATENT DOCUMENTS

| | | | | |
|---|---|---|---|---|
| 5,718,878 | A * | 2/1998 | Zhang | 423/610 |
| 5,958,367 | A | 9/1999 | Ying | 423/701 |
| 6,787,023 | B1 * | 9/2004 | Mohr et al. | 208/27 |
| 6,866,925 | B1 * | 3/2005 | Chane-Ching | 428/304.4 |
| 2004/0035751 | A1 * | 2/2004 | Plee | 208/113 |
| 2004/0151651 | A1 * | 8/2004 | Navrotsky et al. | 423/335 |
| 2004/0192947 | A1 * | 9/2004 | Chane-Ching et al. | 549/533 |
| 2004/0238410 | A1 * | 12/2004 | Inoue et al. | 208/213 |

OTHER PUBLICATIONS

C.W. Chen. *Magnetism and Metallurgy of Soft Magnetic Materials*. Dover, New York 1986. 6-15, no month.

(Continued)

*Primary Examiner*—Wayne A. Langel

(57) ABSTRACT

This invention provides novel stable metallic mesoporous transition metal oxide molecular sieves and methods for their production. The sieves have high electrical conductivity and may be used as solid electrolyte devices, e.g., in fuel cells, as sorbents, e.g. for hydrogen storage, and as catalysts. The invention also provides room temperature activation of dinitrogen, using the sieves as a catalyst, which permits ammonia production at room temperature.

21 Claims, 19 Drawing Sheets

OTHER PUBLICATIONS

P.A. Cox. *The Electronic Structure and Chemistry of Solids*. Oxford University Press. New York 1987. 16-23, no month.
S. Hayashi. K. Hayamizu. *Bull. Chem. Soc. Jpn.* 1991. 64. 688-690, no month.
C.T. Kresge. M.E. Leonowicz, W.J. Roth. J.C. Vartuli, J.S. Beck. *Nature* 1992. 359. 710-712, no month.
G.L. Leigh. *Acc. Chem. Res.* 1992. 25. 177-181, no month.
N.C. Saha, H.G.Tompkins. *J. Appl. Phys.* 1992. 72. 3072-3079, no month.
C.Y. Chen. S.L. Burkette. H.X. Li. M.E. Davis. *Micropor. Mater.* 1993. 2. 17-26, no month.
F.G.N. Cloke. *Chem. Soc. Rev.* 1993. 17-24, no month.
M.E. Davis. *Nature* 1993, 364, 391-393, no month.
M. Witanowski, L. Stefaniak. G.A. Webb. *Ann. Rep. NMR Specirosc.* 1993, 25. 1. 24-31, no month.
Q. Huo. D.I. Margolese. U. Ciesla. D.G. Demuth. P. Feng. T.E. Gier. P. Sieger. A. Firouzi. B.F. Chmelka. F. Schuth. G.D. Stucky. *Chem. Mater.* 1994. 6. 1176-1191, no month.
J. Kubota. K. Aika. *J. Phys. Chem.* 1994. 98. 11293-11300, no month.
P. T. Tanev. M. Chibwe. T.J. Pinnavaia. *Nature* 1994, 368, 321-323, no month.
D.M. Antonelli, J.Y. Ying. *Angew Chem. Int. Ed. Engl.* 1995. 34. 2014-2017, no month.
C.F.. Laplaza. C.C. Cummins. *Science* 1995. 268. 861-863, no month.
K.J.D. MacKenzie. R.H. Meinhold. D.G. McGavin. J.A. Ripmeuster, I. Moudrakovski. *Solid State Nucl. Magn. Reson.* 1995. 4. 193-201, no month.
D.M. Antonelli. J.Y. Ying. *Angew. Chem. Int. Ed. Engl.* 1996. 35. 426-430, no month.
J. Casanovas. J.M. Rican. J. Rubio. F. Illas. J.M. Jimeńez-Mateos. *J. Am. Chem. Soc.* 1996. 118. 8071-8076, no month.
S. Hu. T.M. Apple. *J. Catalysis* 1996. 158. 199-204, no month.
R. Niewa. H. Jacobs. *Chem. Rev* 1996. 96. 2053-2062, no month.
S. Attard. C.G. Göltner. J.M. Corker. S. Henke. R.II. Templer. *Angew. Chem. Int. Ed.* 1997. 36. 1315-1317, no month.
M.D. Fryzuk. J.B. Love. S.J. Rettig. V.G. Young. *Science* 1997. 275. 1445-1447, no month.
A. Imhof. D.J. Pine. *Nature* 1997. 389. 948-951, no month.
Z.R. Tian. J.Y. Wang. N.G. Duan. V.V. Krishan S.L. Suib. *Science* 1997. 276. 926-930, no month.
M. Antonelli. B. Berton. C. Geoltner. H. Hentze. *Adv. Mater.* 1998. 10. 154-159, no month.
B.T. Holland. C.F. Blanford. A. Stein. *Science* 1998. 281. 538-540, no month.
R. Niewa. F.J. DiSalvo. *Chem. Mater.* 1998. 10. 2733-2752, no month.
J.E.G.J. Wijnhoven. W.L. Vos. *Science* 1998. 281. 802-804, no month.
D. Zhao. J. Feng. Q. lluo. N. Melosh. G.N. Frederickson. B.F. Chmelka. G.D. Stucky. *Science* 1998. 279. 548-552, no month.
J. MacLachlan. N. Coombs. G.A. Ozin. *Nature* 1999. 397. 681-684, no month.
K.K. Rangan. S.J.L. Billinge. V. Petkov. J. Heising. M.G. Kanatzidis. *Chem. Mater.* 1999. 11. 2629-2632, no month.
M.D. Fryzuk. S.A. Johnson. *Coordination Chemistry Reviews* 2000. 200-202. 379-409, no month.
X. He. M. Trudeau. D.M. Antonelli. *Adv. Mater.* 2000. 12. 1036-1040, no month.
S. Murray, M. Trudeau, D.M. Antonelli. *Adv. Mater.* 2000. 12. 1339-1342, no month.
M. Vettraino. M. Trudeau. D.M. Antonelli. *Adv. Mater.* 2000. 12. 337-341, no month.
R. Asahi, T. Morikawa. T. Ohwaki. K. Aoki. Y. Taga. *Science*, 2001, 293. 269-271, no month.
C. Guimon. A. Gervasini. A. Auroux. *J. Phys. Chem. B* 2001. 105. 10316-10325, no month.
X. He. M. Trudeau. D.M. Antonelli. *Chem. Mater.* 2001. 13. 4808-4816, no month.
X. He, M. Trudeau. D.M. Antonelli. *Inorg. Chem.* 2001. 13. 2730-2741, no month.
J.J. Schneider. *Adv. Mater.* 2001. 13. 529-533, no month.
M. Vettraino. M. Trudeau. D.M. Antonelli. *Inorg. Chem.* 2001, 40, 2088-2095, no month.
B. Ye. M. Trudeau. D.M. Antonelli. *Adv. Mater.* 2001. 13. 29-33, no month.
X. He. D.M. Antonelli. *Angew Chem. Int. Ed.* 2002. 41. 214-229, no month.
M. Vettraino. H. Xu. M. Trudeau. J.E. Drake. D.M. Antonelli. *Advanced Functional Materials* 2002. 12(3). 174-178, no month.
M. Vettraino. M. Trudeau. A.Y.H. Lo. R.W. Schurko. D. Antonelli. *J. Am. Chem. Soc.* 2002. 124, 9567-9573, no month.
Synthesis of Phosphorus-Free Mesoporous Titania Via Templating With Amine Surfactants, D.M. Antonelli, Microporous and Mesoporous Materials 30 (1999), Elsevier Science B.V. 315-319, no month.

\* cited by examiner

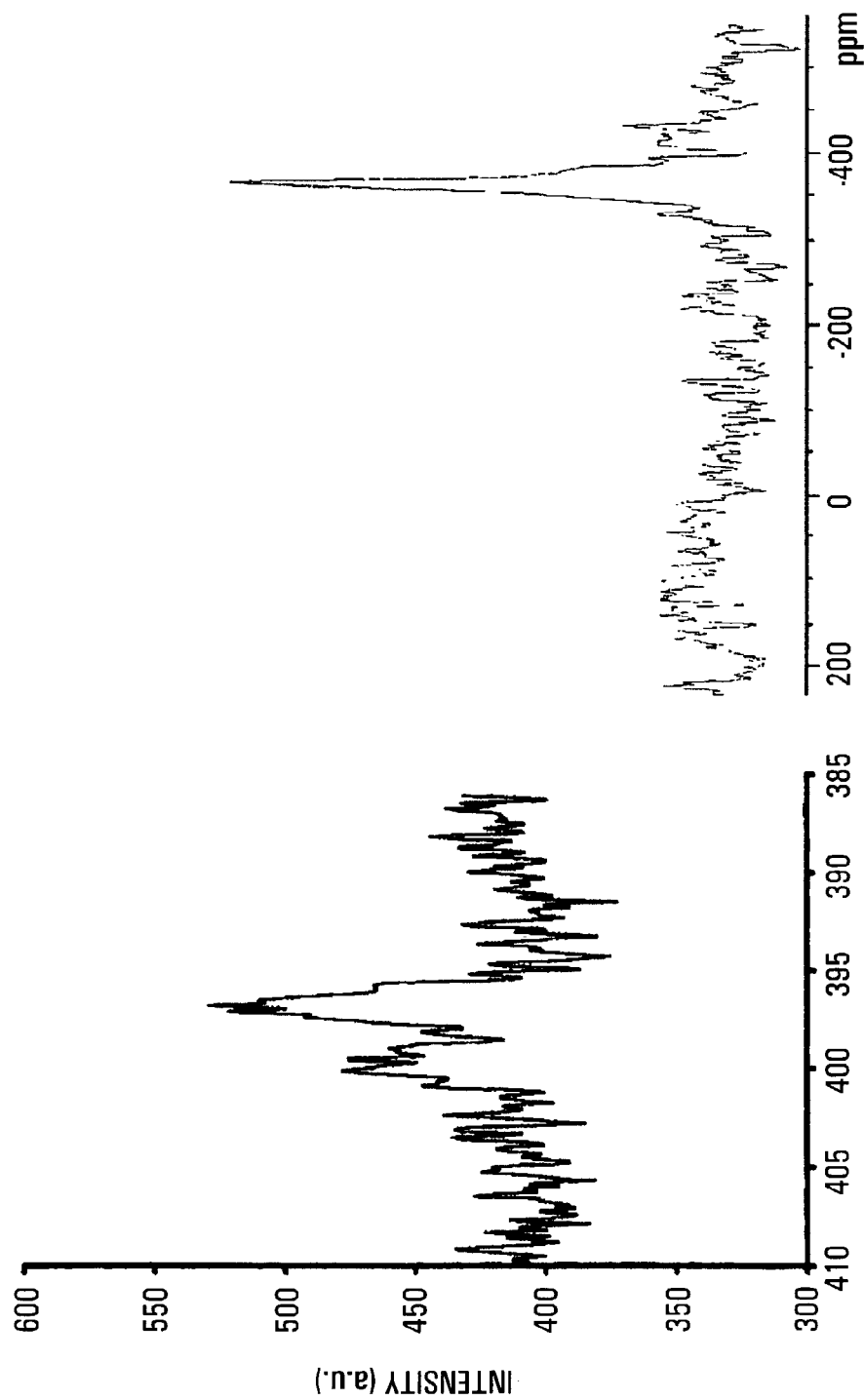

METALLIC MESOPOROUS TRANSITION METAL OXIDE MOLECULAR SIEVES, ROOM TEMPERATURE ACTIVATION OF DINITROGEN AND AMMONIA PRODUCTION

BACKGROUND OF THE INVENTION

1. Field of the Invention

The present invention provides novel stable metallic mosoporous transition metal oxide molecular sieves with new and useful properties. The present metallic sieves may be used in fuel cells, for hydrogen storage or as catalysts. The invention also provides room temperature activation of dinitrogen leading to room temperature production of ammonia using the metallic sieves of the invention as a catalyst.

2. Prior Art

Molecular Sieves

Mesoporous transition metal oxide molecular sieves are known, e.g., for Ti (D. M. Antonelli, J. Y. Ying, Angew. Chem. Int. Ed. Engl. 1995, 34, 2014–2017; U.S. Pat. No. 5,958,367), the first hexagonally packed mesoporous transition metal oxide, and for Nb (D. M. Antonelli, J. Y. Ying, Angew. Chem. Int. Ed. Engl. 1996, 35, 426–430). However, the known mesoporous transition metal oxide molecular sieves are insulators and in this aspect are similar to silica based pore structures.

The fabrication of materials with regular pore structures on the nanometer to micrometer level is one of the most active areas of modern materials science. By manipulating synthesis conditions it is possible to create continuous inorganic structures with regularly spaced voids while also controlling the overall topology of the porous matrix. This has been achieved using small molecules[1], self-assembled organic micelles[2-5], amphiphilic block-copolymers[6-7] and even latex spheres[8-9] or oil droplets[10] as templating agents. These structures have for the most part been based on silica because of its versatile solution chemistry, low cost, and thermal stability. While materials with controlled architectures exist for a few transition metal oxides[11] they are even more rare for sulfides[12,13] and pure metals.[14] Metallic structures with regular porosity would have potential applications in catalysis and the fabrication of energy harvesting devices, because of the combination of an enormous accessible internal void space with the high reactivity and conductivity associated with metals. Many low-valent oxides possess metallic properties, however, the synthesis conditions of most structure-directing reactions are too severe to prevent oxidation of the low-valent metal oxide precursor. For this reason reduction of existing porous structures to a metallic state may be a more effective strategy.

$N_2$ Activation and $NH_3$ Production

The Haber-Bosch process, which has proven the most successful commercially, reacts $N_2$ gas with three equivalents of $H_2$ gas over a metal catalyst to produce ammonia (Eq. (1)) While this reaction is exothermic and thermodynamically favored under ambient conditions, the feedstock gases must be compressed to several hundred atmospheres to favor ammonia production at the high temperatures currently required. A catalyst that could perform this reaction at lower temperatures, and therefore lower pressures, would be economically advantageous; advancements in this area have been made using a Ru-based catalyst on graphite instead of an Fe-based catalyst.

Haber-Bosch Process

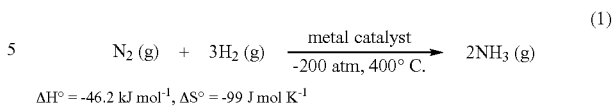

$\Delta H° = -46.2$ kJ mol$^{-1}$, $\Delta S° = -99$ J mol K$^{-1}$

While the Haber-Bosch process differs substantially from the biological fixation of dinitrogen, both of these processes involve the activation of $N_2$ by a transition metal-containing catalyst. Numerous efforts have been made to develop synthetic metal-base catalysts to functionalize molecular nitrogen under mild conditions. Although some progress has been made in this area, many of the systems remain intriguing curiosities and are commercially impractical.

The limited reactivity of dinitrogen and the harsh conditions required to convert $N_2$ into useful nitrogen-containing compounds are in contrast with the reactivities of other small molecules. The gases CO, $H_2$, $O_2$ and ethylene undergo a variety of reactions catalyzed by transition metals under relatively mild conditions and therefore find use in a number of industrial processes. The catalytic activation of molecular nitrogen to produce nitrogen-containing compounds and particularly ammonia, under mild conditions remains an important goal.

For a more detailed discussion of the above background on dinitrogen activation and ammonia production see the review article: The Continuing Story of Dinitrogen Activation by Michael D. Fryzuk and Samuel A. Johnson, Coordination Chemistry Reviews, 200–202 (2000) 379–409, and the references cited therein.

SUMMARY OF THE INVENTION

In one aspect, the present invention provides a metallic mesoporous transition metal oxide molecular sieve (metallic sieve) comprising: (a) a mesoporous transition metal oxide molecular sieve (non-metallic sieve), comprising at least 50 molar % of a transition metal oxide selected from the group consisting of titanium oxide, zirconium oxide, niobium oxide, hafnium oxide, tantalum oxide and a mixture thereof; and (b) at least one transition metal or lanthanide metal deposited in pores of said mesoporous transition metal oxide molecular sieve.

The invention also provides for uses of the metallic sieve as a solid electrolyte, for hydrogen storage or catalyst. A particular use of the metallic sieve is in the activation of $N_2$ leading to the synthesis of $NH_3$.

BRIEF DESCRIPTION OF THE DRAWINGS

FIG. 4(a) is an XPS spectrum of a sample of reduced mesoporous niobium oxide after treatment for 24 h at room temperature with $N_2$.

FIG. 4(b) is an $^{15}N$ MAS NMR (magic angle spinning nuclear magnetic resonance) spectrum of a sample of reduced mesoporous niobium oxide after treatment for 24 h with $^{15}N_2$.

DETAILED DESCRIPTION OF THE INVENTION

Mesoporous Transition Metal Oxide Molecalar Sieves

Figure 1:
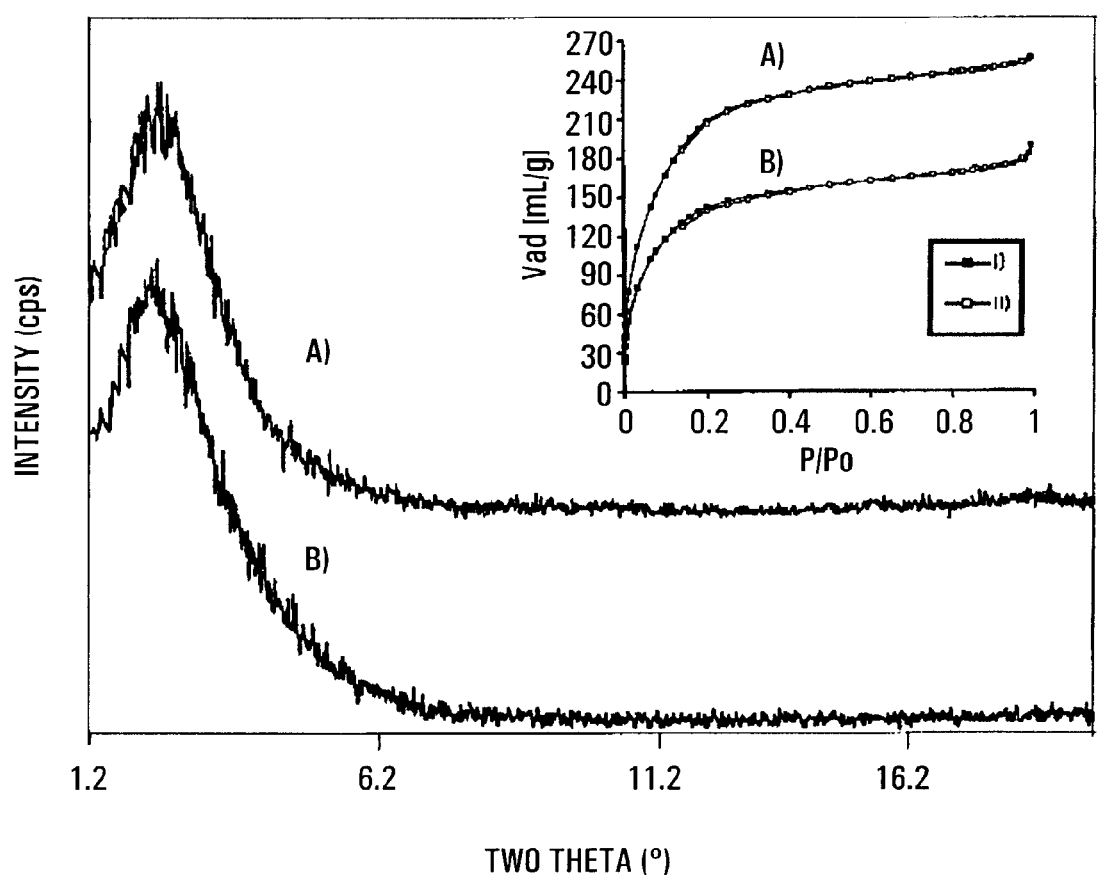
FIG. 1 is an X-ray power diffraction (XRD) pattern of a sample of mesoporous niobium oxide before (a) and after (b) treatment with bis(toluene)niobium in toluene.

As noted above, mesoporous transition metal oxide molecular sieves are known from the prior art, e.g. U.S. Pat. No. 5,958,367, the disclosure of which is incorporated herein by reference. The known mesoporous transition metal oxide molecular sieves will be referred to as "non-metallic sieves" for short in this application, whereas the novel metallic mesoporous transition metal oxide molecular sieves will be referred to as "metallic sieves" for short in this application.

The term "metallic" for the purposes of this application means a species having "a partially filled conduction band", i.e., possessing metallic conductivity.

A "mesoporous structure" is one with a regular array of channels having substantially uniform diameter or "pore" size. The pore size generally ranges from about 20 to about 500 Å, e.g., about 18 to about 500 Å. However, the pore size may even range from about 10 to about 500 Å. Preferred pore sizes are in the range of from about 20 to 200 Å. More preferably, the pore sizes are in the range of about 20 to 50 Å or about 20 to about 40 Å.

The total available surface area of the non-metallic sieves when measured by BET (Brunauer-Emmett-Teller) may vary in the range of from about 50 to about 1200 $M^2g^{-1}$. For example, in the range from about 400 to about 1000 $M^2g^{-1}$.

Both the pore size and total available surface area of the non-metallic sieves will depend on the particular metal oxide used and the synthesis route, as detailed in U.S. Pat. No. 5,958,367.

As detailed in U.S. Pat. No. 5,958,367, the non-metallic sieves are stable, e.g., thermally stable up to about 900° C.

The non-metallic sieves used in this invention should comprise at least 50 molar percent of a transition metal oxide selected from the group consisting of titanium oxide, zirconium oxide, niobium oxide, hafnium oxide, tantalum oxide and a mixture thereof.

Therefore, when the non-metallic sieves comprise essentially only one or more of the above noted five oxides, the non-metallic sieves may be essentially 100 molar % titanium oxide, zirconium oxide, niobium oxide, hafnium oxide or tantalum oxide; or the non-metallic sieves may be 50 molar % of one of the five noted oxides and 50 molar % of a further one of the five oxides. However, other mixtures of the five oxides are also possible, e.g., 50 molar % of one oxide (such as titanium oxide), 25 molar % of a second oxide (such as niobium oxide) and 25 molar % of a third oxide (such as tantalum oxide). Mixtures with any four of the oxides or all five of the oxides are also possible. In any mixture of the five oxides, any one oxide can range from 0 molar % to <100 molar %.

Preferably, the non-metallic sieves comprise more than 50 molar % of one or more of the five oxides, e.g., at least 60 molar %. More preferred are greater molar % of one or more of the five oxides, e.g, at least 70 or 80 molar %. Most preferred are sieves which comprise at least 90 to 99 molar % of one or more of the five oxides.

As noted above, the non-metallic sieves should comprise at least 50 molar % of one or more of the five oxides. Accordingly, the non-metallic sieves may comprise at most 50 molar % of one or more other components, in addition to the five oxides.

Preferably, the other component(s) comprise at most 40 molar % of the non-metallic sieves. More preferably, the other component(s) comprise at most 30 or 20 molar %. Most preferably, the other component(s) comprise 10 to 1 molar % of the non-metallic sieves.

The other component(s) may be one or more different inorganic oxides or metal salts. Suitable inorganic oxides include oxides of transition metals, lanthanide metals, alkali metals (Group IA), alkaline earth metals (Group IIA), and main group metals (Group IIIA-VIIA). Example of the inorganic oxides are oxides of Y, V, Ir, Os, Rh, Pt, Pd, Au, Fe, R, Ru, Cu, Co, Hg, Tl, Ni, and/or Cr. Suitable metal salts include alkali metal salts, alkaline earth metal salts and transition metal salts. Preferred salts include alkali metal halides, such as KCl and NaCl.

A "transition metal", as used herein, is an element designated in the Periodic Table as belonging to Group IIIB (scandium and yttrium), Group IVB (titanium, zirconium and hafnium), Group VB (vanadium, niobium and tantalum), Group VIB (chromium, molybdenum and tungsten), Group VIIB (manganese and rhenium), Group VIIIB (iron, ruthenium, osmium, cobalt, rhodium, iridium, nickel, palladium and platinum), Group IB (copper, gold and silver) and Group IIB (zinc, cadmium and mercury). A "lanthanide metal" is a metal belonging to the lanthanide series in the Periodic Table (lanthanum, cerium, praseodymium, neodymium, promethium, samarium, europium, gadolinium, terbium, dysprosium, holmium, erbium, thulium, ytterbium and lutetium).

A "transition metal oxide", as used herein, is a transition metal bonded to one or more oxygen atoms. A "lanthanide metal oxide", as used herein, is a lanthanide metal bonded to one or more oxygen atoms.

It should be noted that in older Periodic Tables, the transition metals were divided into groups named as follows with reference to the above noted group names; further the most recent IUPAC group names of the transition metals are also shown:

| Notation Used Herein | Old Notation | Current IUPAC |
|---|---|---|
| IIIB | IIIA | 3 |
| IVB | IVA | 4 |
| VB | VA | 5 |
| VIB | VIA | 6 |
| VIIB | VIIA | 7 |
| VIIIB | VIII | 8, 9, 10 |
| IB | IB | 11 |
| IIB | IIB | 12 |

Additionally, the "A" and "B" may be "a" and "b".

The preparation of the mesoporous transition metal oxide molecular sieves used in this invention whether comprising essentially only one or more of the five noted oxides of Ti, Zr, Nb, Hf or Ta, or up to at most 50 mole % of the noted other components is carried out according to the methods known in the prior art, e.g., U.S. Pat. No. 5,958,367.

Metallic Mesoporous Transition Metal Oxide Molecular Sieves

The novel metallic sieves of this invention comprise the above described non-metallic sieves wherein a metal is deposited in the pores of the non-metallic sieve to give a metallic sieve. The metal deposited in the pores of the non-metallic sieve, i.e., on its surface, is not specifically or necessarily in the zero valent form. For example, as described in detail below with reference to Examples 1, 2 and 3, when preparing the metallic sieves using bis(toluene) niobium/titanium/tantalum, the niobium, titanium or tantalum is in the zero valent state in the toluene organometallic compound. In the process of the Examples, the non-metallic sieve oxidizes the organometallic species, bis(toluene)niobium/titanium/tantalum, so that the metal atoms, e.g., Nb, Ti or Ta, deposited in the pores of the non-metallic sieve are oxidized. As detailed in Examples 1 and 2, XPS gives evidence for the +2 state in each case for Nb and Ti. Since oxygen is the only other element present, i.e., freely available in the pores of the non-metallic sieve for reaction with the deposited metal, a metal rich oxide phase is produced in the pores of the non-metallic sieve. Therefore, the deposited metal is in a lower oxidation state with respect to the inner walls of the pores of the non-metallic sieve but in a higher oxidation state with respect to the, e.g., above-noted toluene organometallic compound.

The deposited metal may be any transition metal or lanthanide metal as defined above. Further the deposited metal may be a single transition metal or a single lanthanide metal or a mixture of two or more transition metal(s) and/or lanthanide metal(s).

Therefore, it will be understood that the unique combinations of titanium oxide/titanium metal, zirconium oxide/zirconium metal, niobium oxide/niobium metal, hafnium oxide/hafnium metal or tantalum oxide/tantalum metal are within the scope of this invention when the non-metallic sieve used is an essentially 100 molar % of one of the above described five oxides and the transition metal deposited therein is a single transition metal corresponding to the transition metal of the oxide.

The following are other combinations which can be used with the non-metallic sieves and deposited transition metal(s) and/or lanthanide metal(s) to give metallic sieves within the scope of this invention:

(i) any combination of the five metal oxides for the non-metallic sieve which is deposited with (a) one or (b) any combination of the transition metal(s) and/or lanthanide metal(s);

(ii) one or any combination of the five metal oxides and further comprising one or more of the above identified other components in the molar % ranges given above for the non-metallic sieve which is deposited with (a) or (b) as described in (i).

The exact combination both for the non-metallic sieve and the metallic sieve will depend on a number of factors, such as: availability and cost of the non-metallic sieve and deposited transition metal(s) and/or lanthanide metal(s), e.g., Ti is more readily available and cheaper than Nb; the desired synthetic route for both the non-metallic sieve and the metallic sieve (detailed below); and the end use of the metallic sieve, e.g., as a catalyst, for hydrogen storage or as a solid phase electrolyte. For example, if the metallic sieve is to be used in heterogeneous catalysis, then the deposited transition metal(s) and/or lanthanide metal(s) may be a combination of many such metals, as is normal in heterogeneous catalysis to achieve the desired result unattainable with one metal. However, if the metallic sieve is to be used as a catalyst for $N_2$ activation, as discussed later, the deposited transition metal(s) and/or lanthanide metal(s) may be any one or more as defined above for "transition metal" and "lanthanide metal", but the preferred deposited transition metal(s) and/or lanthanide metal(s) may be, e.g., one or a combination or mixture of Ti, Nb, Ta, Ru and/or Pt. Furthermore one or more of the deposited metal(s) could form discontinuous grains relative to one or more of the other deposited metal(s), e.g., for an $N_2$ activation catalyst, the Ru and/or Pt may form discontinuous grains in the Ti, Nb and/or Ta deposit.

The metallic sieves can be used in a wide variety of catalytic techniques, e.g.: catalytic cracking of petroleum feedstocks, hydrocarbon reforming, photocatalytic degradation of organic halides, $NO_x$ decomposition, methane oxidation, olefin reduction, hydroformylation, alkylation, hydrosulfurization, solid acid catalysis and $N_2$ activation leading to, e.g., $NH_3$ production, and incorporation and coupling reactions between $N_2$ and acetylenes or olefins leading to nitrogen containing heterocycles. The person skilled in the art will be able to determine the desirable properties in the non-metallic sieve for each type of catalysis reaction contemplated, e.g., pore size, total BET surface area and the type and amount of other components. Similarly, the skilled person will be able to determined the transition metal(s) and/or lanthanide metal(s) to be deposited in the pores of the non-metallic sieve to give the desired metallic sieve for the contemplated catalysis reaction.

A further use of the metallic sieves is as solid electrolyte devices, e.g., in fuel cells or solar energy harvesting devices. The property which allows the metallic sieves to be used, e.g., as electrodes, is their high electrical conductivity. For example, the electrical conductivity of the metallic sieves as compared to the corresponding non-metallic sieves may be in the order of $10^4$ greater. For example, the conductivity of a NbO/Nb metallic sieve is similar to that of NbO, whereas the corresponding NbO non-metallic sieve has a much lower conductivity than the NbO/Nb metallic sieve. The non-metallic niobium oxide sieve is an insulator and is a Nb(V) oxide of the formula $Nb_2O_5(H_2O)_x$. All Nb(V)oxides are insulators. In the present invention NbO refers specifically to Nb(II)oxide of this exact composition. NbO is metallic. The present metallic sieves consist of two layers, an inner layer which is Nb(IV) [the bis(toluene)niobium reagent, as discussed later, reduces the Nb(V) to Nb(IV)] and a second outer layer which is Nb(II) with an undetermined amount of oxygen present. The Nb(II) layer appears to make the metallic sieve "metallic" in nature.

The metallic sieves, like carbon nanotubes, may also be used for hydrogen storage.

The preparation of the metallic sieves is carried out according to standard metal deposition techniques known in the art. Any of the well known electro-deposition, physical vapor deposition or chemical vapor deposition techniques may be used. Deposition from a liquid medium reaction is also possible.

The technique used will again depend on the type of non-metallic sieve and metal(s) to be deposited. The above noted stability of the non-metallic sieves allows a wide variety of techniques to be employed for depositing the metal(s) in the pores of the sieves.

Figure 2:
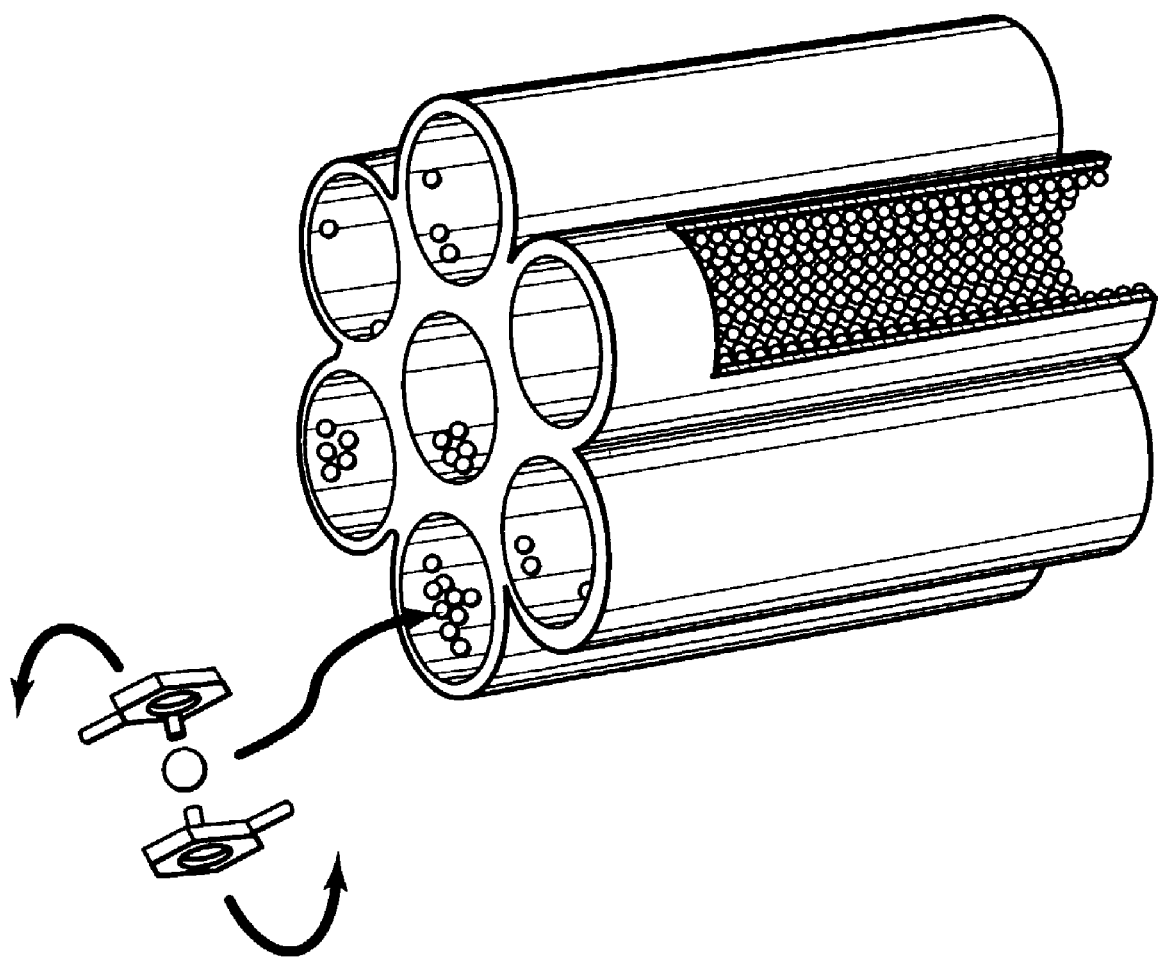
FIG. 2 is a schematic representation of deposition of Nb atoms from bis(toluene)niobium to the inner surface of a mesoporous oxide.

One technique is schematically illustrated in FIG. 2 and is detailed in the Examples. In FIG. 2, the first step involves electron transfer from, e.g., an organo-Nb compound such as bis(toluene)niobium, to the walls of, e.g., a niobium oxide mesostructure. The unstable toluene-Nb cation then loses the toluene ligands and deposits the Nb atoms on the surface of the partially reduced mesoporous framework. These Nb atoms can then react with surface moisture and Nb—OH units to form a continuous oxide layer. Extensive treatment with excess bis(toluene)niobium results in a layer-by-layer coating of the walls ultimately leading to complete occlusion of the pores. However, it should be noted that the surface area of the metallic sieve is only slightly reduced relative to the surface area of the corresponding non-metallic sieve, and the pore sizes of the metallic sieve are only slightly smaller than the pore sizes of the corresponding non-metallic sieve. Accordingly, the surface area and pore sizes of the non-metallic sieves are essentially maintained in the resultant metallic sieves, thus providing the necessary large surface areas and pore volumes for use of the metallic sieves in, e.g., catalysis. The high reactivity of the internal oxide surface is readily illustrated by the conversion of dinitrogen to surface nitride, a process in oxides that normally requires high reaction temperatures and forcing conditions. Besides the bis(toluene) organometallic compounds used in the present examples, any other arene type organometallic compound could also be used. However, the reagents used for the metal deposition are not limited to arene organometallics or even organometallics of whatever type. Inorganic reagents can be used just as well. For example, later transition metals such as Ru and Pt could be deposited by hydrogen reduction of their salts, e.g., $RuCl_3$ and $PtCl_4$. However, this technique may not work as well with early transition metal salts, such as $TiCl_4$ or $ZrCl_4$, because it is more difficult to reduce such salts.

The person skilled in the art will be able to determine the type or types of metal deposition techniques to be used with each type of non-metallic sieve and the metal or metals to be deposited. Where more than one metal needs to be deposited, the deposition may be effected simultaneously, e.g., from a mixed compound(s) or complex(es) of the metals or an alloy of the metals, or sequentially.

$N_2$ Activation and $NH_3$ Production

A particular use of the metallic sieves of the present invention is as a catalyst for $N_2$ activation leading, inter alia, to $NH_3$ formation.

As previously discussed, $N_2$ activation is difficult to achieve. Thus, $NH_3$ production on a commercial scale has been limited to the Haber-Bosch process with its attendant disadvantages of high pressure/high temperature. The present invention, through the use of the metallic sieves described herein, essentially provides a normal pressure and temperature variation of the Haber-Bosch process.

The feedstocks for the process, as in the Haber-Bosch process, are $N_2$ and $H_2$. However, the reaction can be effected under normal pressures, e.g., atmospheric, and normal temperatures, e.g., room temperature.

On an industrial scale, the reaction of $N_2$ and $H_2$ to produce $NH_3$ would be effected in a plant setting as would be known to those skilled in the art, e.g., the supplying of the $N_2$ and $H_2$ feedstocks and the collection of the $NH_3$ product. As known to those skilled in the art, the $N_2$ and $H_2$ feedstocks would have to be of sufficient purity to avoid undesirable side reactions and poisoning of the catalyst, e.g., reactive contaminants such as $O_2$ should not be present. The metallic sieve catalyst of the process, if needed, may be supported on a catalyst support as known to those skilled in the art, e.g., alumina. The reaction chamber may be any suitable one, e.g., a fluidized bed of the unsupported or supported metallic sieve catalyst. However, the metallic sieve catalysts may also be used in non-industrial applications, e.g., a catalytic converter for a motor vehicle. If needed, the metallic sieve catalyst may be regenerated by treatment with an appropriate reducing agent, e.g., $H_2$.

It should be noted that although $H_2O$ is, of course, much more reactive than $N_2$, in the present invention $N_2$ activation occurs in preference to any reaction involving $H_2O$ because the water beneath the surface of the metallic sieve takes some time to diffuse to the surface areas of the pores of the metallic sieve where any reaction must take place. Hence, $N_2$, which is supplied to the metallic sieve, is much more abundant than $H_2O$ at the reactive surface of the pores and thus reacts more quickly. In the case of Example 3, the reaction of $N_2$ in a Ta metallic sieve is almost instantaneous.

The invention is not limited to any theoretical explanation put forward herein.

The invention will be further described by the following non-limiting examples.

EXAMPLE 1

Nb/Nb Oxide Mesoporous Molecular Sieves and N$_2$ Activation

As detailed below, the treatment of mesoporous niobium oxide[15-19] with bis(toluene)niobium leads to mesoporous materials with metallic properties via single atom Nb transfer to the walls of the structure. The conductivity of these materials is 10,000 times greater than that of semiconducting mesoporous Mn oxides.[20] Because of their high surface areas of up to 700 m$^2$g$^{-1}$, these new metal oxide structures differ substantially from non-oxide mesostructured Pt systems[14] which have low surface areas of only 23 m$^2$g$^{-1}$ with no discernable diffraction pattern, virtually the same as that for colloidal Pt. The unique properties of these materials are illustrated by a room-temperature dinitrogen cleavage reaction, an extremely rare process[21-23] that is central to the development of catalytic processes involving nitrogen incorporation into substrate molecules.

When a sample of mesoporous niobium oxide[15] possessing a BET surface area of 947 m$^2$g$^{-1}$ and an HK (Horvath-Kowazoe) pore size of 23.1 Å with an HK pore volume of 0.69 cm$^3$g$^{-1}$, and an XRD pattern displying a single peak at d=32 Å, is treated with excess bis(toluene)niobium in toluene over several days under argon, an intensely black coloured solid is obtained, which is collected by suction filtration and dried in vacuum. As used herein and in Example 2, "excess" means that the non-metallic sieve is reacted with more of the bis(toluene)niobium (or titanium) organometallic compound than the non-metallic sieve can react with so that the organometallic compound is always present in the reaction solution. The nitrogen adsorption isotherm (FIG. 1) of this new air sensitive material yields a BET surface area of 702 m$^2$g$^{-1}$ and an HK pore size of 19.9 Å with an HK pore volume of 0.49 cm$^3$g$^{-1}$, while the XRD pattern displays a single peak at d=32 Å (FIG. 1), indicating that the mesostructure had been fully retained. Elemental analysis of this material gave values of 0.18% C, 1.49% H, and 67.66% Nb (ash) as compared to 0.23% C, 1.27% H, and 52.18% Nb (ash) in the starting material. The increase in % Nb with a small decrease in % C indicates that the bis(toluene)niobium has donated Nb atoms to the structure with complete loss of the toluene ligand. This is further supported by a lack of C—H stretches in the IR spectrum. Materials synthesized by applicant with other organometallic sandwich compounds display strong C—H stretches and C values of 7-14%. In general 0.8 equivalents of organometal is absorbed per molar equivalent of mesoporous oxide on the basis of % Nb. Since the bis(toluene)niobium cation is unstable and is thought to decompose upon formation by oxidation of the highly reducing neutral complex[24] and mesoporous Nb oxide is a potent electron acceptor, it is likely that local electron transfer from the organometallic compound to the walls of the Nb mesostructure induces decomposition of the organometallic compound on the inner and outer surface of the material. This is supported by the decrease in HK pore size expected from a stepwise thickening of the walls of the structure. The lack of hysteresis in the nitrogen adsorption/desorption isotherm is indicative of cylindrical pores with no diffusion bottleneck, ruling out the possibility of Nb grains blocking the pore channels. The present synthetic scheme is summarized in FIG. 2 as detailed above.

Figures 3A, 3B:
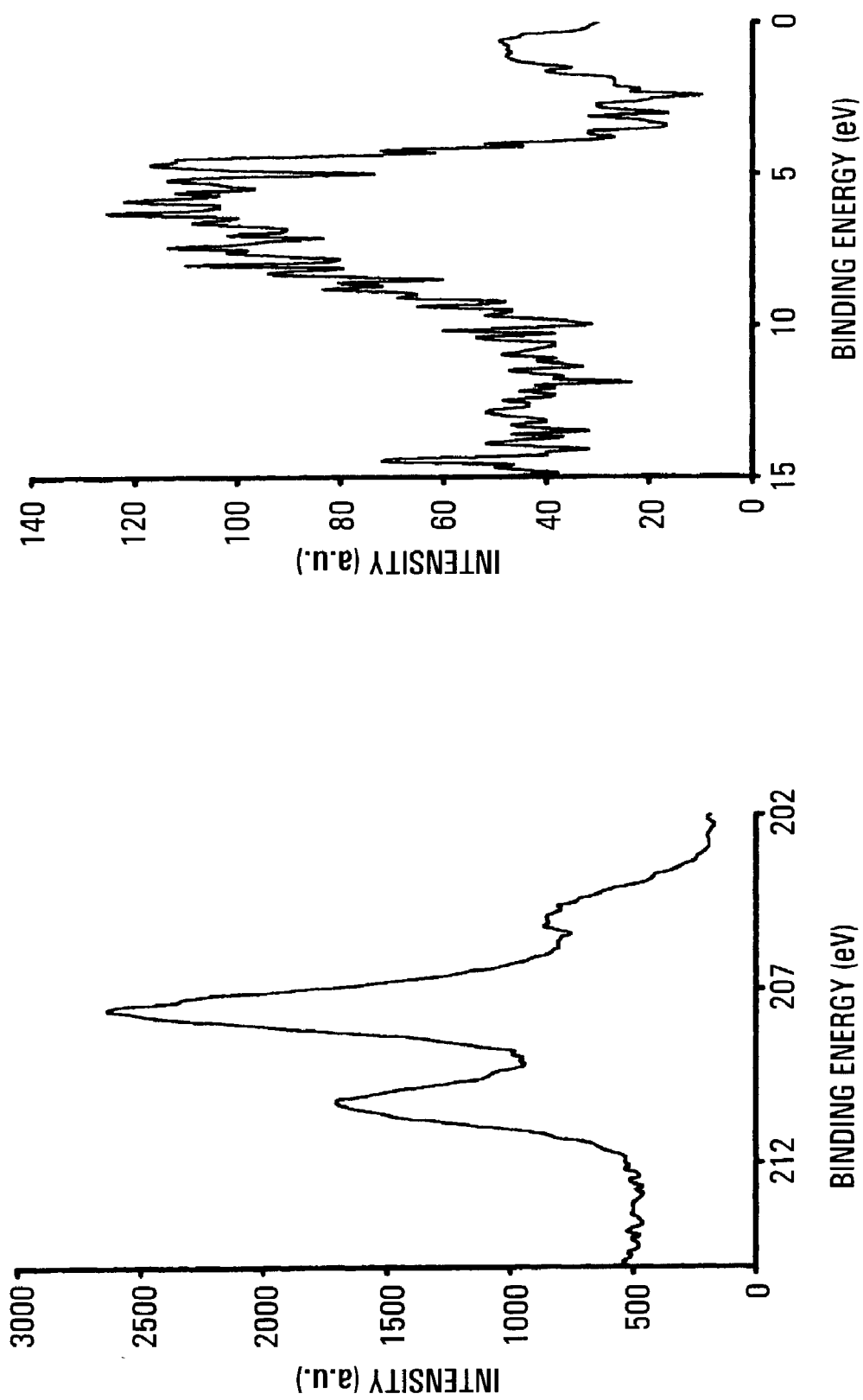
FIG. 3(a) is an X-ray photoelectron spectrum (XPS) spectrum of mesoporous niobium oxide treated with bis(toluene)niobium showing the Nb 3d region.
FIG. 3(b) is an XPS spectrum of mesoporous niobium oxide treated with bis(toluene)niobium showing the valence region near the Fermi level.

FIG. 3a shows the Nb 3d region of the XPS displaying several peaks for the 3/2 and 5/2 emissions. The first set of peaks at 210.2 eV and 207.1 eV can be assigned to the reduced Nb oxide mesostructure according to previous work by applicant,[16] giving an average oxidation state of 4.8$^+$ as calculated on the basis of comparison to the same materials reduced with Na.[16] There is a second Nb species present with a 5/2 emission at 205.2 eV, the corresponding 3/2 peak buried under the other emissions at higher binding energy. The position of the 5/2 peak is consistent with Nb$^{II}$ and can be assigned to the Nb atoms deposited on the mesostructure by bis(toluene)niobium. There is no evidence for Nb metal at 202–203 eV. Further, Nb metal is not expected as a product of oxidative decomposition of the bis(toluene) species. The valence region near the Fermi level (FIG. 3b) displays two peaks, one broad at about 3.3 eV for the Nb—O sp valence electrons and the second centered at 1.0 eV corresponding to the Nb 4d band. This second peak was not observed in the XPS spectrum of any other of applicant's reduced materials and extends past the Fermi level, suggesting that this material is metallic.[25] Low-valent metallic oxides such as NbO and VO$_2$ typically display a peak near the Fermi level, its extension beyond the 0 eV state being a signature of metallic rather than semiconducting behavior. The room-temperature electrical conductivity of this material was $1.0 \times 10^{-2}$ $\Omega^{-1}$ cm$^{-1}$,[26] which is 10,000 times higher than previously reported for any mesoporous material without a conducting phase in the pores, and very close to that of bulk metallic NbO ($2.1 \times 10^0$ $\Omega^{-1}$ cm$^{-1}$), although direct comparisons to bulk NbO and previously reported mesoporous Mn oxides may not be informative as in applicant's material conductivity is proposed to occur only on the internal and external surface of the material. Given the grain boundary effects expected to be at play in this system, these conductivities are surprisingly high. Interestingly, while Na-reduced mesoporous Nb oxide is insulating because of electron localization in defects, reduction by Nb atom transfer leads to a material with metallic conductivity.

This suggests that bis(toluene)niobium treatment leaves an electronically continuous low-valent Nb oxide phase on the surface of the largely insulating mesostructure. The variable temperature conductivity was measured from ambient to liquid nitrogen temperatures and showed that the conductivity steadily increased to a value of $4.8 \times 10^{-1}$ $\Omega^{-1}$ cm$^{-1}$ at 77 K. This is consistent with metallic, rather than semiconducting behavior.

Figure 3C:
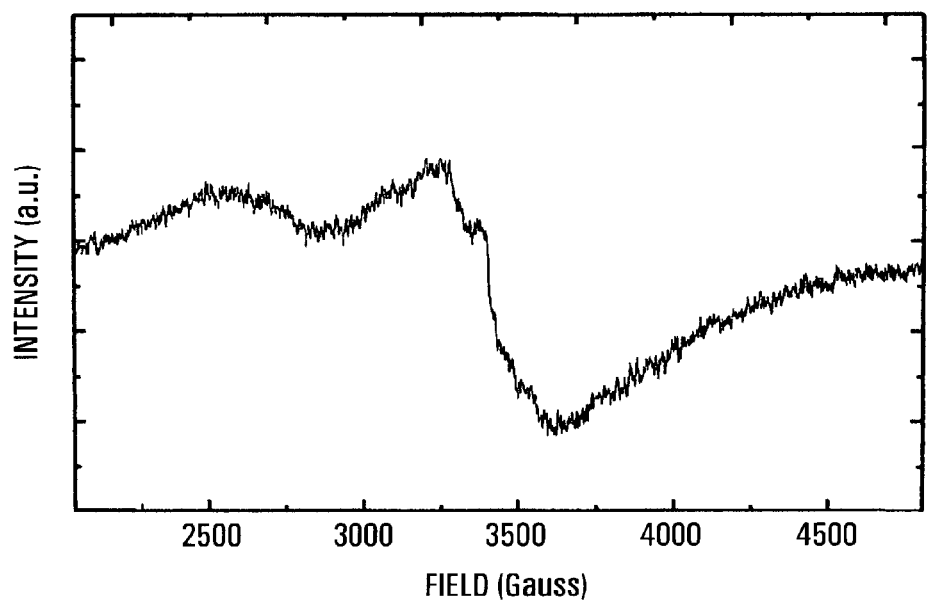
FIG. 3(c) is an electron paramagnetic resonance (EPR) spectrum of mesoporous niobium oxide treated with bis(toluene)niobium.
Figure 3D:
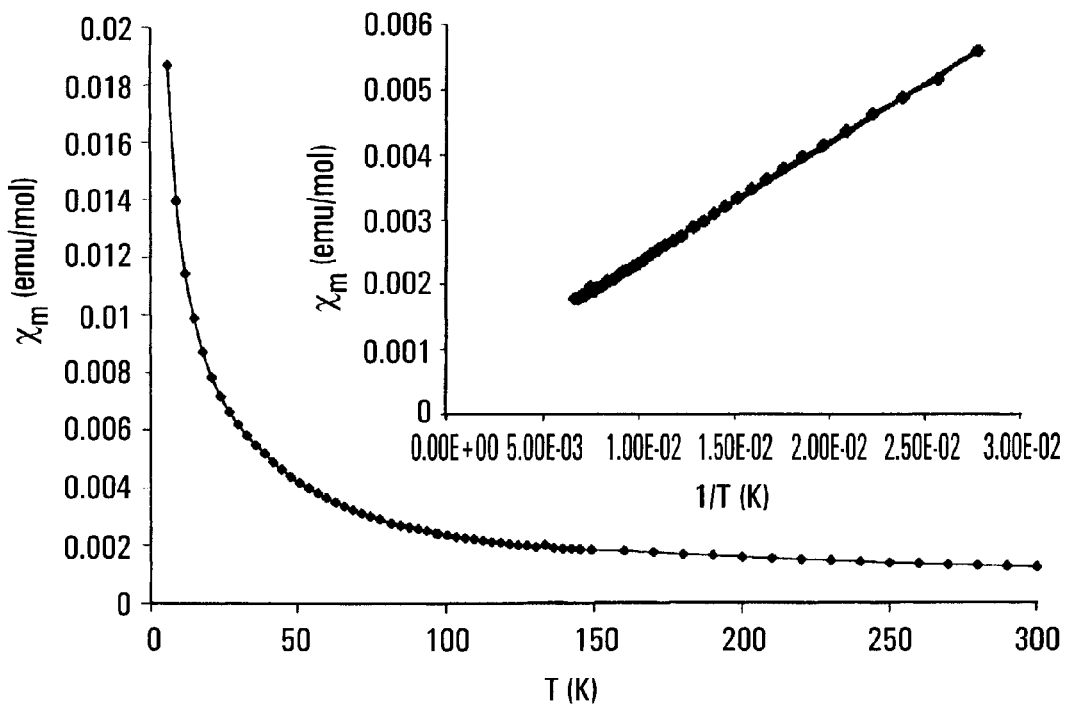
FIG. 3(d) is a plot of molar magnetic susceptibility ($\chi$m) versus temperature (T) from the zero field cooled (ZFC) data for mesoporous niobium oxide reduced with bis(toluene) niobium; and the inset is a high-temperature region (>30K) of the plot of $\chi$m vs. $T^{-1}$.

The UV-visible spectrum of this material shows a complex series of absorbances including one at 270 nm for the Nb—O sp valence band to conduction band transition. The weak series of absorbances from 400–590 nm indicate that the material has a more complex electronic structure than that of Na-reduced mesoporous niobium oxide, which only displays absorbances at 270 nm and 580 nm.[16] This is not altogether unexpected given the amorphous nature of the walls of the material and the presence of at least two species of Nb. The EPR spectrum is shown in FIG. 3c and displays a broad peak at 3496 G (g=2.00=ratio of magnetic moment to angular momentum) as well as a second peak at 2433 G (g=2.83). The peak at 3496 G is virtually identical to that in the EPR spectrum of the Na-reduced material and can be assigned to the free electron in the more highly oxidized regions of the mesostructure. The lack of hyperfine splitting ($^{93}$Nb, I=9/2) can be explained by a broad distribution of sites in the disordered walls of the mesostructure and/or fast exchange between these sites. The second peak can be indexed to Nb 4d electrons in the low-valent Nb phase. The large g value of 2.83 is indicative of a strong influence from proximal Nb centers, while the lack of hyperfine coupling is expected from the amorphous nature of this phase. FIG. 3d shows the plot of magnetization versus temperature for the reduced material. The inset shows the plot of $\chi m$ vs. $T^{-1}$ over the high-temperature region (>30 K) where the Curie Law is strictly obeyed. Below 30 K the slope decreases slightly, indicating that the Curie Law is not obeyed in this region. The intercept at $6.0 \times 10^{-4}$ emu mol$^{-1}$ corresponds to the temperature-independent paramagnetism expected on the basis of the emission at the Fermi level. This number is in good agreement with values for other related early transition metal compounds.[26] The linear plot of $\chi m$ vs. $T^{-1}$ demonstrates that the Curie-Weiss Law results in a better fit throughout all temperature regions. From this data a Weiss constant $\theta$ of $-3.1°$ C. can be extracted. The negative value of this number is consistent with subtle antiferromagnetic coupling interactions. Analysis of the data on the basis of the molecular formula calculated from the elemental analysis gives a $\mu_e$ of 1.41 Bohr magnetons, consistent with an average of less than one unpaired electron per niobium center. This can be accounted for as a mixture of contributions from the free electron in the walls and the $d^3$ Nb$^{II}$ species confirmed by the XPS. On the basis of 0.8 equivalents of $d^5$ Nb$^0$ absorbed per $d^0$ Nb$^V$, there is a theoretical maximum of 2.2 unpaired electrons per Nb atom, indicating that a significant degree of spin pairing is taking place in the system. After heating for several hours with excess bis (toluene)niobium at 80° C. the reduced Nb-materials show a further decrease in HK pore size to less than 17 Å and a type 1 nitrogen adsorption isotherm typical of a microporous material, expected from a thicker metallic coating on the internal walls of the pore channels. These materials possess conductivity values up to $2.0 \times 10^{-1}$ $\Omega^{-1}$ cm$^{-1}$ consistent with a more continuous metallic coating on the surface of the material. This gradual layer-by-layer coating and eventual filling of the pores may be useful in creating multi-layered heterojunctions within the pores of nano-structured materials.

The high reactivity of the low-valent niobium oxide surface of these materials is readily illustrated by their facile reaction with dinitrogen. Treatment of these materials with dinitrogen overnight at room temperature leads to new black materials with virtually the same XRD pattern (d=32 Å) and comparable nitrogen adsorption isotherms (673 m$^2$g$^{-1}$, HK pore size=19 Å). Elemental analysis shows an increase in N content from <0.01% to 0.3–1.5%, indicating that up to 8% of the Nb atoms present in the mesostructure are active in this process as calculated on the basis of the % Nb in the material and assuming a 1:1 N/Nb reaction stoichiometry. The N 1 s region of the XPS shows emissions at 396.9 eV and 399.6 eV consistent with two reduced N$^{3-}$ species (FIG. 4a).[27] There was no emission at 400 or 402 eV corresponding to chemisorbed or physisorbed dinitrogen, suggesting this molecule has been cleaved on the surface. As expected from the relatively small number of active sites in the material, the Nb region is virtually identical to that of the reduced starting material with a reduction of intensity of the peak at 205.2 eV, indicative of a small degree of oxidation of the Nb$^{II}$ species. When the reaction is conducted with $^{15}N_2$, the solid-state $^{15}N$ NMR spectrum (FIG. 4b) exhibits two overlapping peaks at $-356.3$ ppm and $-381.2$ ppm, confirming that dinitrogen is the source of these species. These resonances are related to the two species determined by XPS and are consistent with sp$^3$ hybridized N$^{3-}$ as opposed to terminal nitride resonances that can fall as low as +840 ppm.[21] For comparison, the $^{15}N$ shift of dodecylamine coordinated to the Nb centers on the inner surface of the as-synthesized mesoporous niobium oxide appears at $-361.9$ ppm.[11] The ca. 900 Hz line broadening is attributable to a combination of interactions of the $^{15}N$ centers with the $^{93}Nb$ quadrupole (I=9/2) and the line broadening expected from the paramagnetic nature of the sample. Air oxidized samples are diamagnetic, but still exhibit the same two resonances with ca. 400 Hz line broadening indicating that most of this effect in the non-oxidized sample is due to quadrupole interactions. The activation of dinitrogen by low-valent metal complexes is extremely rare, and is generally confined to coordinatively stressed $d^2$ and $d^3$ centers.[21-23] In the solid state this process normally requires metal plasmas or microwave heating of metal oxide precursors,[28, 29] although a small number of pure bulk metals can form a thin nitride coat on the surface under some conditions. The facility of nitrogen activation in applicant's oxide-based system can be attributed to the high fraction of exposed low-coordinate Nb$^{II}$ centers on the inner surface of the material.

Thus applicant has synthesized the first example of a stable oxide-based molecular sieve with metallic properties. The conductivity can readily be tuned by varying the amount of dopant in the structure from insulating to values close to that of bulk NbO. The high reactivity and catalytic potential of these materials is underlined by a rare room-temperature reaction with dinitrogen. Because of the high surface areas, controlled pore sizes, and high volume of active centers expected from the percentage of defects in an amorphous structure, this material may also find use in model systems for nitrogen activation processes.

In the above, mesoporous materials were synthesized according to reference[11] and stirred under an inert atmosphere for several days in toluene with excess organometallic material. The material was then collected by suction filtration, washed four times with toluene, and then dried in vacuum. Nitrogen adsorption and desorption data were collected on a Micromeritics ASAP 2010. Room-temperature electron transport measurements were conducted on a Jandel 4-point universal probe head combined with a Jandel resistivity unit. Variable temperature resistivity experiments were conducted using a programmable current source and a voltmeter on epoxy-coated pellets using silver paste as contacts to four copper wires. XRD patterns (Cu K$\alpha$) were recorded in a sealed glass capillary on a Siemens D-500 $\theta$–2$\theta$ diffractometer. All XPS peaks were referenced to the carbon C—(C,H) peak at 284.8 eV and the data were obtained with a Physical Electronic PHI-5500 using charge neutralization. The EPR spectra were recorded at room temperature on an X-band Bruker ESP 300E Spectrometer equipped with a microwave counter, an NMR magnetometer, and an elecromagnet capable of providing a magnetic field range from 50 G to 15 kG. The measurement conditions were microwave power 20.00 mW, microwave frequency 9.78 GHz, modulation frequency 100.00 kHz, modulation amplitude 1.969 G, receiver gain $1.00 \times 10^5$. The power samples were sealed under vacuum in quartz tubes. Magnetic measurements were conducted on a system with a 5 T magnet. Data was converted to molar susceptibilities on the basis of the elemental analysis (NbO$_{2.64}$C$_{0.02}$H$_{2.05}$, MW=137.5 g mol$^{-1}$) and then corrected for diamagnetic contributions from the relevant constituent atoms ($4.2 \times 10^4$ emu mol$^{-1}$). A least squares data fit of the high-temperature region yielded a straight line with a Y-intercept of $6.0 \times 10^{-4}$ emu mol$^{-1}$ corresponding to the temperature-independent paramagnetism. The NMR spectra were recorded at 36.835 MHz at room temperature with 1828 acquisitions on an Oxford 363 MHz spectrometer with a superconducting magnet and a Tecmag console. Shifts are relative to external nitromethane at 0.0 ppm.

EXAMPLE 2

Ti/Ti Oxide Mesoporous Molecular Sieve, $N_2$ Activation and $NH_3$ Synthesis Mesoporous titanium oxide was treated with bis(toluene) titanium under nitrogen at room temperature in toluene, leading to a new blue-black material possessing conductivity values of up to $10^{-2}$ ohm$^{-1}$ cm$^{-1}$. XRD and nitrogen adsorption showed that the mesostructure was fully retained. Elemental analysis indicated that the material absorbed Ti from the organometallic, without any incorporation of the toluene ligand. There was also an increase of nitrogen from below the detection limit to 1.16%. XPS studies showed that the Ti framework was reduced by the organometallic and that the material had reduced nitride on the surface. There was also an emission at the Fermi level, suggesting metallic behavior. This was confirmed by variable temperature conductivity studies, which showed a gradual decrease of resistivity with temperature. Superconducting quantum Interference device (SQUID) magnetometer studies revealed spin glass behavior with a degree of temperature independent paramagnetism, consistent with metallic properties. Solid state $^{15}N$ NMR studies on materials synthesized in the presence of labeled dinitrogen showed that the source of the nitride was the reaction atmosphere. IR and $^{15}N$ NMR demonstrated that this nitrogen species was surface ammonia, suggesting that the initially-formed nitride species had reacted with moisture imbedded in the walls of the mesostructure. The direct conversion of dinitrogen to ammonia is a very rare process and this represents the first example of this process mediated by a molecular sieve.

Mesoporous titanium oxide reacts with bis(toluene)titanium in a nitrogen atmosphere to give surface ammonia, most likely via an initial reductive cleavage by the reduced titania mesostructure, followed by hydrolysis of the nitride by water embedded below the inner surface of the mesostructure. This is the first example of conversion of dinitrogen to ammonia mediated by a molecular sieve. While many electropositive metals react with dinitrogen to form an inert nitride coat, the ease of protonation of the surface nitride in this system suggests that it may be ideal for the development of nitrogen reduction catalysts that may offer superior properties to those already in use.[30]

Figure 5:
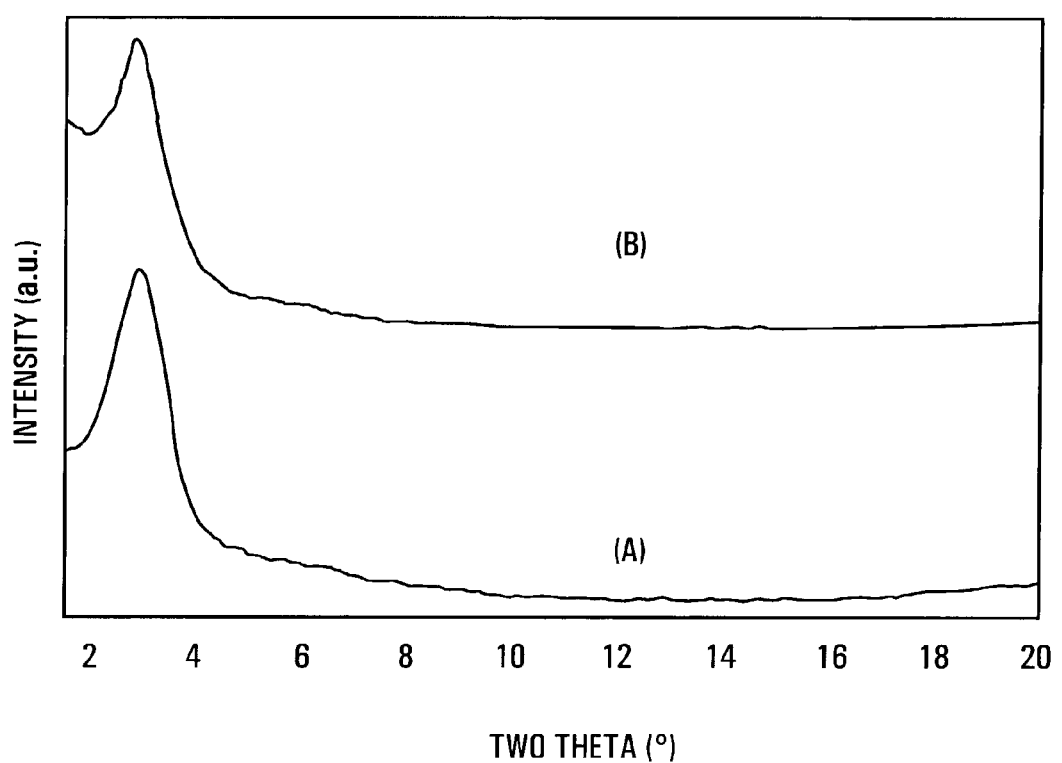
FIG. 5 shows XRD patterns of (a) mesoporous titanium oxide with a 24 Å pore size and (b) a sample from (a) after treatment with bis(toluene)titanium in toluene under $N_2$.
Figure 6:
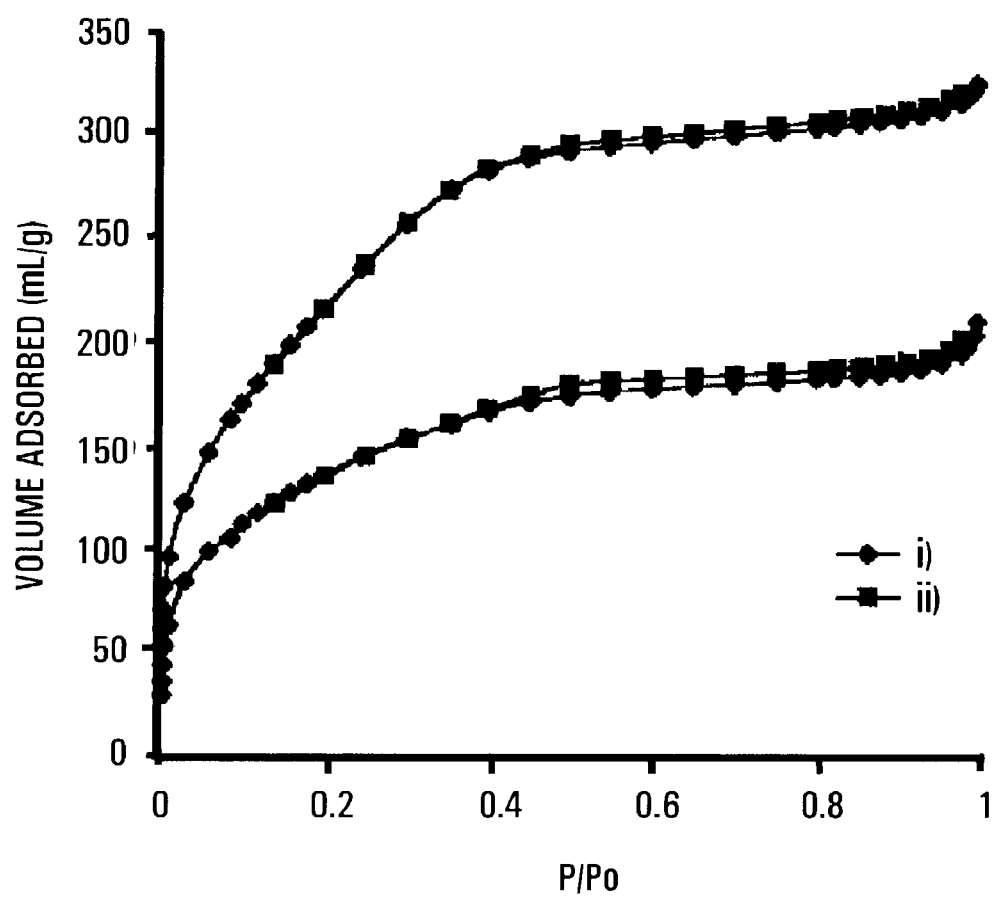
FIG. 6 shows nitrogen adsorption (i) and desorption (ii) isotherms of samples from FIG. 5(a) upper curve and FIG. 5(b) lower curve.

A sample of trimethylsilylated mesoporous titanium oxide, possessing a BET surface area of 785 m$^2$g$^{-1}$, an HK pore size of 24 Å, and an XRD pattern displaying one peak centered at d=32 Å, was treated with excess bis(toluene)titanium in toluene over 24 h until absorption was judged complete. The new blue-black material was collected by suction filtration, washed with excess toluene, and dried in vacuo. Generally about 1.3 weight equivalents of the organometallic were absorbed per weight equivalent of the mesoporous oxide. The XRD pattern of this air sensitive solid displayed a broad peak centered at d=32 Å (FIG. 5) while the BET surface area dropped to 507 m$^2$g$^{-1}$ and the HK pore size decreased to 19 Å (FIG. 6). The elemental analysis of this new material gave 51.13% Ti, 2.56% C, 1.07% H, 0.62% Si, and 1.16% N as compared to 38.11% Ti, 3.12% C, 1.36% H, 0.94% Si, and <0.01% N in the starting material. From these data a molecular formula of $Ti_{1.0}O_{2.5}C_{0.2}H_{1.0}N_{0.08}Si_{0.02}$ can be calculated. The increase in Ti with a small decrease in the C suggests that the bis(toluene)titanium lost the toluene ligand and acted as a Ti atom donor to the mesostructure, leaving a thin layer of a new Ti species on the surface of the pore channels. The thermal decomposition of bis(toluene)titanium over mesoporous aluminum oxide has been used previously as a method of depositing nanoscale grains of Ti metal in the pores of the alumina,[31] however, the present approach differs as decomposition is likely induced by oxidation of the organometallic Ti(0) complex by the Ti(IV) mesostructure, since bis(toluene)titanium is thermally stable at room temperature.[24] As noted above, a similar oxidative decomposition was confirmed by XPS in previous studies on the closely analogous reduction of mesoporous niobium oxide by bis(toluene)niobium. The most salient feature of the elemental analysis, however, is the incorporation of 1.16% N in the material, since the only nitrogen source present in the synthesis conditions was $N_2$, an extremely robust molecule that is notoriously difficult to activate. The IR spectrum shows a broad absorbance centered at 3410 cm$^{-1}$ that can be assigned to moisture embedded in the walls of the mesostructure, as well as a smaller broad absorbance at 3180 cm$^{-1}$ suggestive of a hydrogen-bonded N—H species. As noted above, mesoporous niobium oxide treated with bis (toluene)-niobium under argon led to the formation of a thin film of low valent Nb(II) species on the surface and that treatment of this material with dinitrogen led to formation of surface nitride. $^{15}N$-NMR studies confirmed that the source of the nitride was indeed dinitrogen, however the specific nature of this nitride species was not established. The extension of this chemistry to Ti-based systems represents a significant step since bis(toluene)niobium is extremely difficult to synthesize[24] and Ti is a much less expensive metal than Nb. There is also considerable interest in developing nitrogen-doped titania for use as visible light photocatalysts.[32]

Figure 7B:
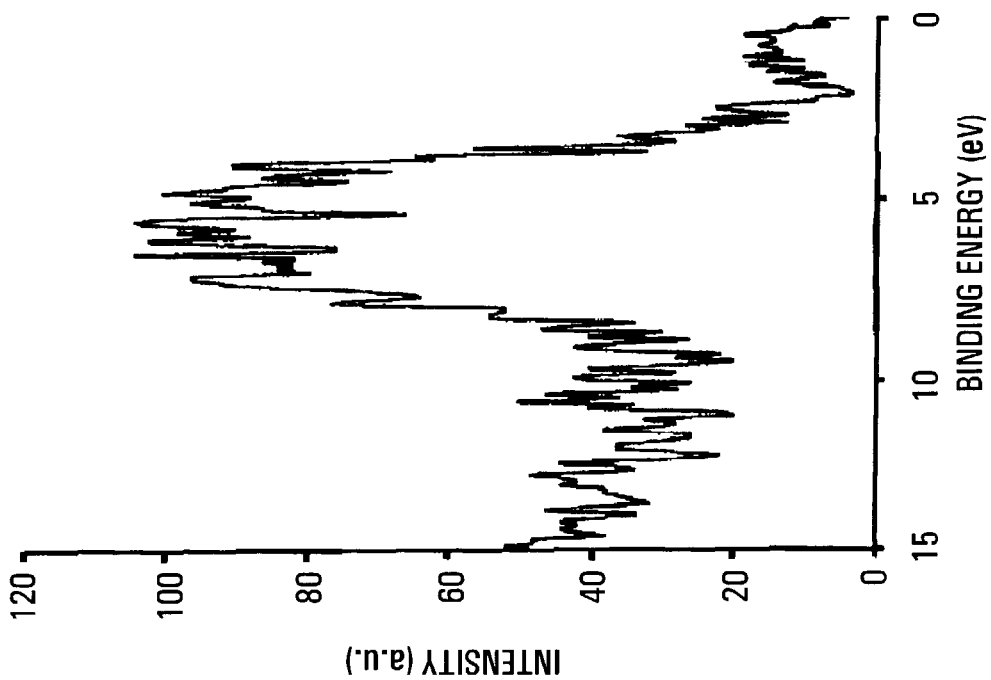
FIG. 7 are XPS spectra of mesoporous titanium oxide treated with bis(toluene)titanium under $N_2$ showing (a) the Ti 3p 1/2, 3/2 region, (b) the region near the Fermi level, and (c) N 1s region.
Figure 7A:
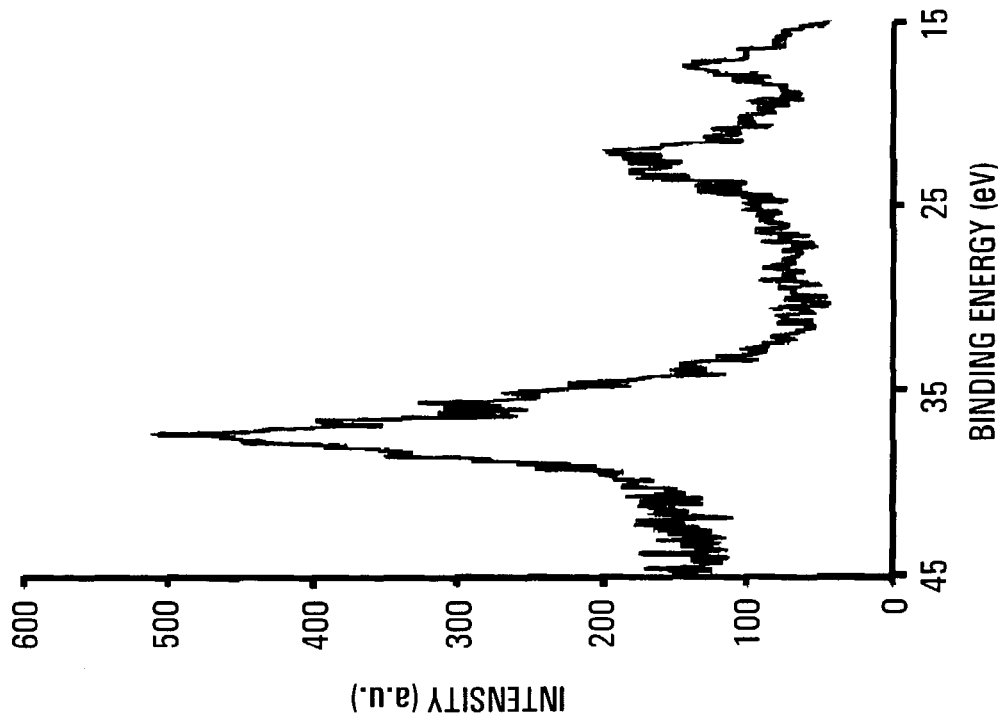
Figure 7C:
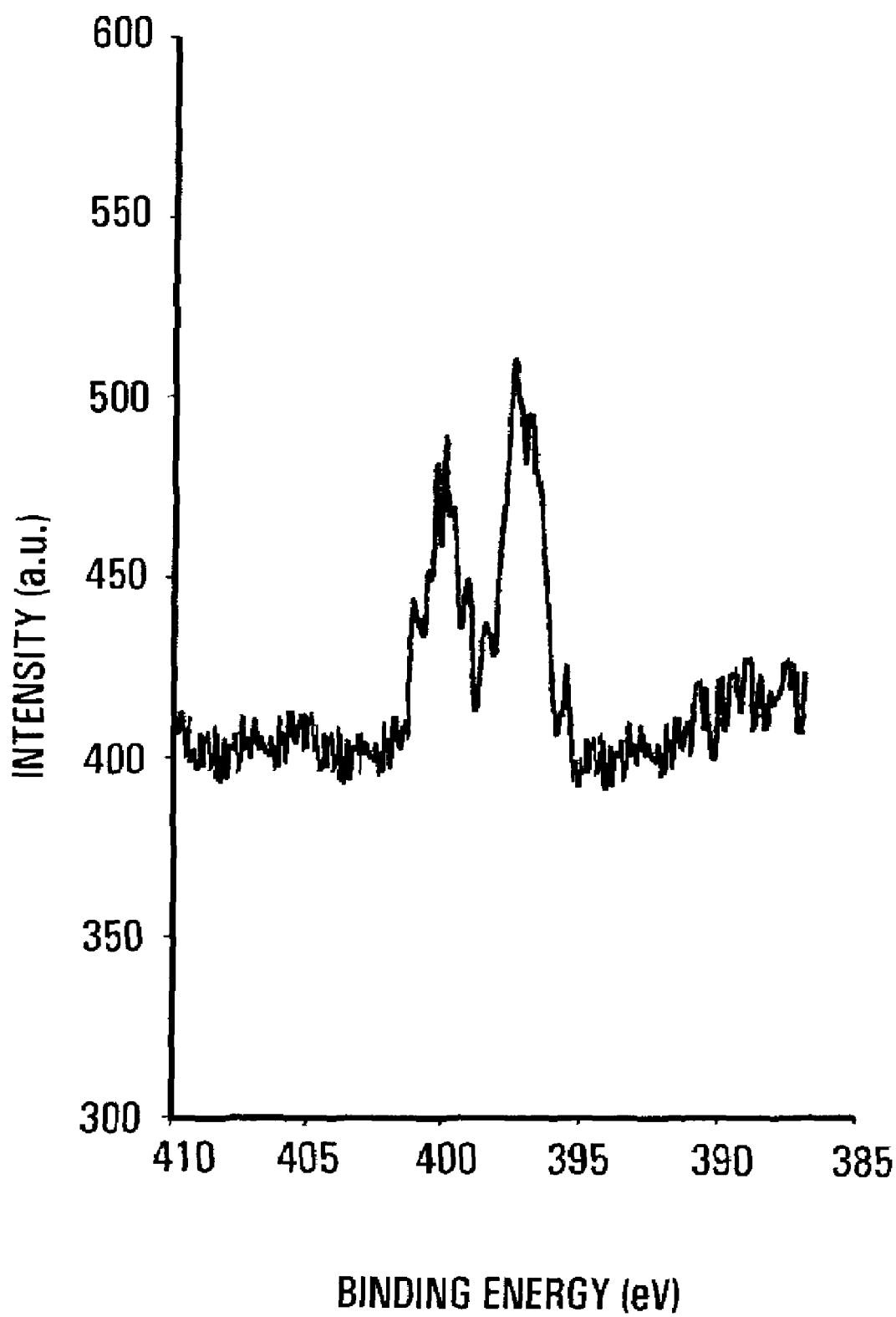
Figure 8:
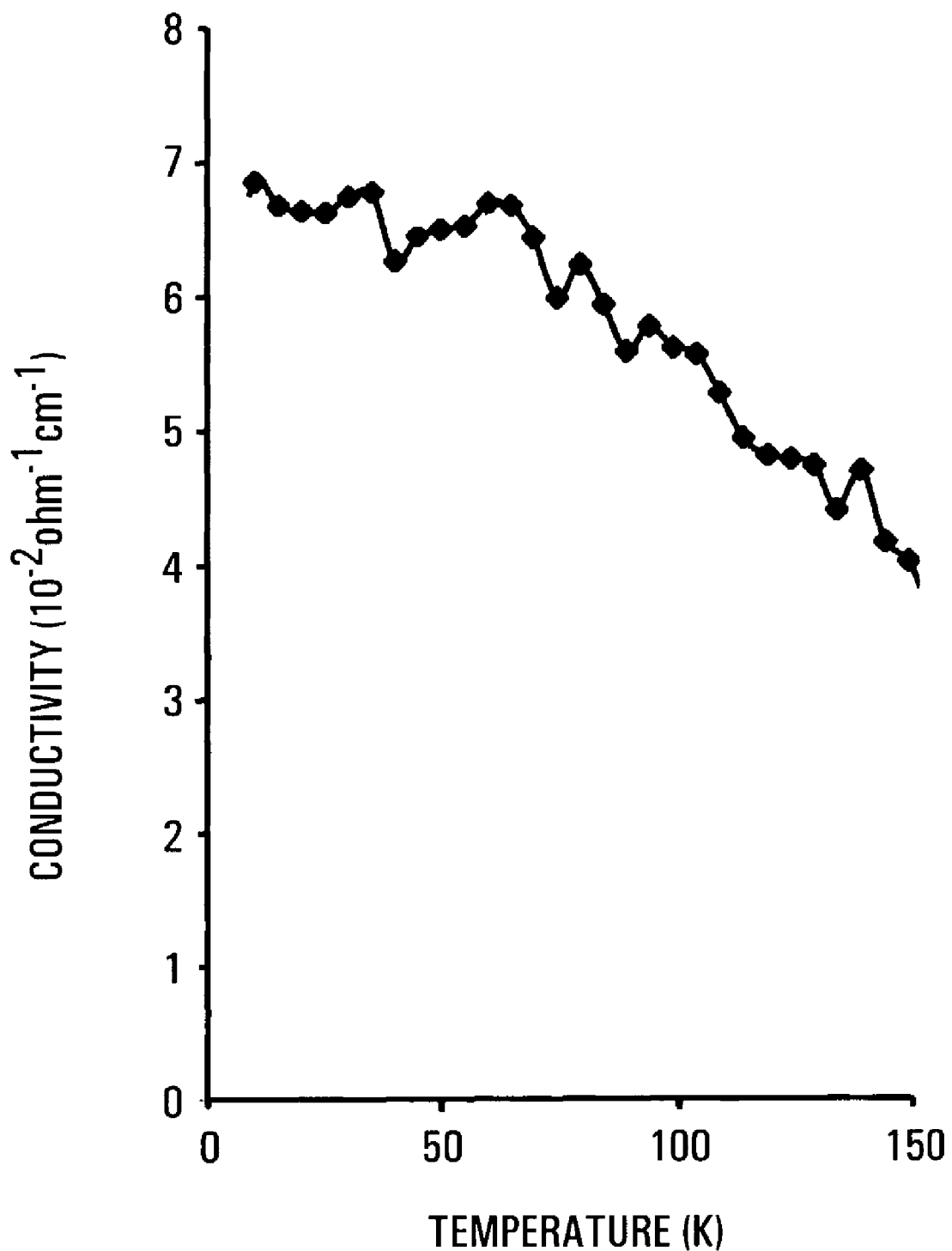
FIG. 8 is a plot of variable-temperature four-point conductivity measured on epoxy-coated pellets of mesoporous titanium dioxide treated with bis(toluene)titanium.

In order to further probe into the nature of the surface species present in this new reduced mesoporous titanium oxide material, X-ray photoelectron spectroscopy studies were conducted. FIG. 7a shows the 3p 1/2, 3/2 region of the XPS spectrum of a sample of mesoporous titanium oxide treated with bis(toluene)titanium. The 3p 1/2 emission falls at 37.5 eV, as compared to 36.8 eV in the material reduced with 1.0 equivalents of Li and 37.9 eV in the unreduced material. The gradual shift to lower binding energy on reduction of the framework has been commented on before;[16] in this case the emission at 37.5 eV demonstrates reduction of the framework to a level of about Ti 3.6$^+$. There is a shoulder at 35.1 eV corresponding to Ti(II), which is likely associated with the reduced phase on the surface. There is no evidence for Ti metal originating from the organometallic. These data are in accord with analogous mesoporous niobium oxide materials reduced with bis(toluene)niobium under nitrogen, which display two clear emissions in the Nb 3/2, 5/2 region corresponding to Nb 4.8$^+$ and Nb 2$^+$. The N 1s region is also similar to that in the Nb material (FIG. 7c), exhibiting emissions at 399.8 eV and 397.3 eV corresponding to two reduced nitride species. There was no discernable evidence for chemisorbed $N_2$ which comes at 402 eV. Saha reported peaks at 397.1 eV and 399.2 eV for samples of partially oxygenated TiN,[33] while Guimon et al reported that ammonia absorbed onto the surface of titanium oxide exhibits N 1s emissions at 400.1 eV and 402.3 eV for Lewis and Brønsted sites, respectively, and 399.1 eV for surface amide.[34] From these values and the IR data, the emission at 399.8 eV in applicant's material can be assigned to surface ammonia, while the emission at 397.3 eV is due to a second nitride species, the identity of which is not clear. FIG. 7b shows the region near the Fermi level of the material reduced with bis(toluene)titanium. The large emission from 3–8 eV corresponds to the O 2 p valence band electrons while the smaller hump at the Fermi level is indicative of metallic behavior, common in low-valent early transition metal oxides such as VO, TiO, and NbO.[25] Electron transport measurements using the 4-point method on pressed pellets of this material show surprisingly high conductivity values of $10^{-2}$ ohm$^{-1}$ cm$^{-1}$, over 1000 times greater than the Ti-based materials reduced with 1.0 equivalents of Li. The plot of conductivity versus temperature is shown in FIG. 8, and displays a slight increase by a factor of 2 on decreasing the temperature to liquid helium values. This behavior is typical of a classical metal. The EPR spectrum of this material displays one broad resonance centered at 2.0 g that can be assigned to free electrons in the inner walls of the reduced Ti $3.6^+$ mesostructure on the basis of previous work on the EPR spectra of reduced mesoporous Ti oxide species.[35] There is a second resonance at higher field, much broader and lower in intensity, which can be assigned to the reduced Ti species on the surface of the material.

Figure 9A:
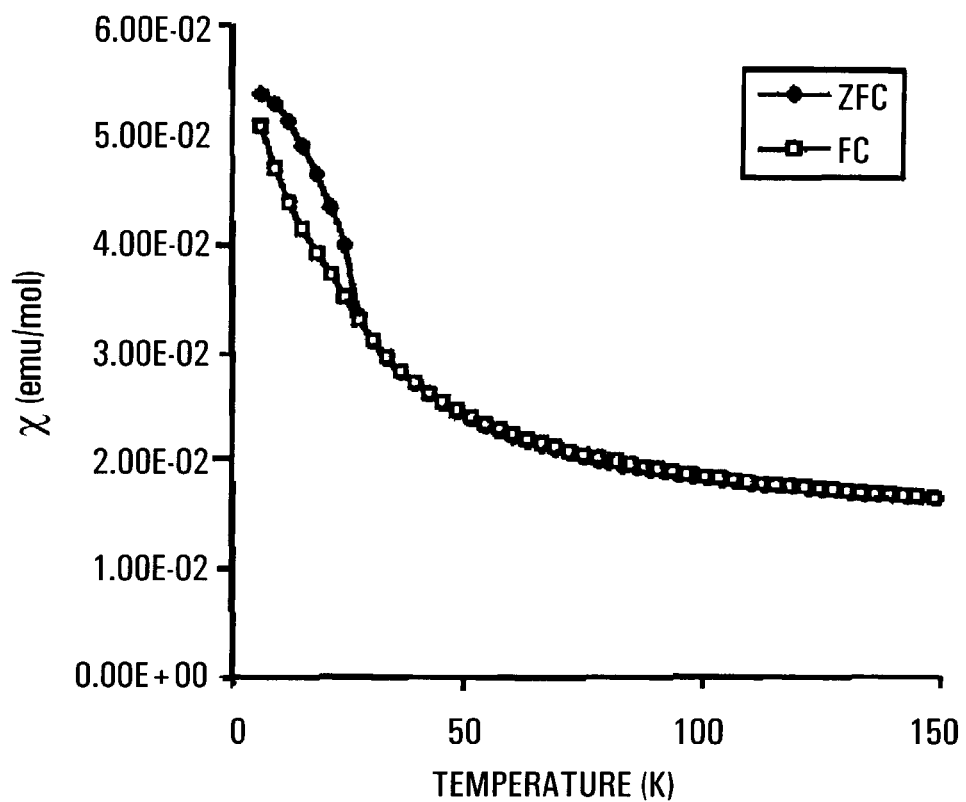
FIG. 9(a) is a plot of ZFC and field cooled (FC) molar magnetic susceptibility versus temperature for a sample of mesoporous titanium oxide treated with bis(toluene)titanium under $N_2$.
Figure 9B:
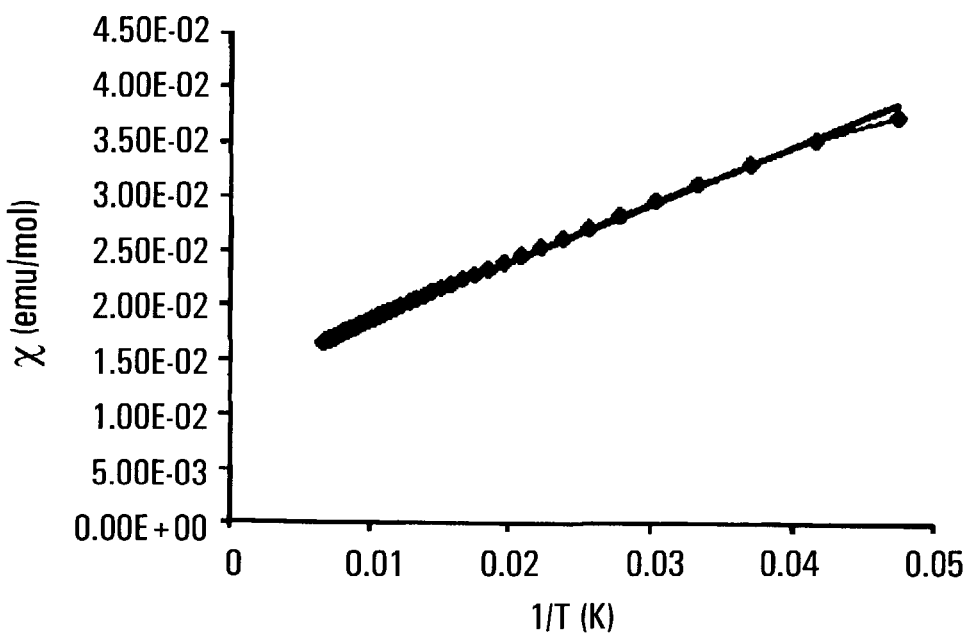
FIG. 9(b) is a plot of molar magnetic susceptibility versus inverse temperature for the sample from FIG. 9(a).

FIG. 9a shows a plot of the ZFC and FC molar magnetization versus temperature for the sample in FIG. 7 over a temperature range from 4–150 K. The transition at around 20 K in the ZFC branch of the plot is a signature of spin glass behavior, also observed in cobaltocene and nickelocene composites of mesoporous niobium oxide.[36] Above 20 K, the magnetization decreases with increasing temperature according to the Curie law, and shows a temperature independent term expected on the basis of the high conductivity and the emission at the Fermi level in the XPS spectrum. FIG. 9b shows the plot of molar magnetization versus $T^{-1}$, exhibiting a Y-intercept at $1.32 \times 10^{-2}$ emu, corresponding to the temperature independent paramagnetism. From the temperature dependant branch of this data a $\mu_{eff}$ of 2.1 can be calculated, indicative of 1.30 unpaired electrons per stoichiometric unit.[26] This is in accord with the stoichiometry of the material which permits a maximum of 1.74 unpaired electrons per Ti center on the basis of the amount of bis(toluene)titanium ($d^4$) absorbed by the T(IV) ($d^0$) framework. The difference of 0.44 between these two numbers can be accounted for by the presence of some spin pairing, expected in a composite oxide material showing evidence of both metallic and spin glass behavior.

Figure 10A:
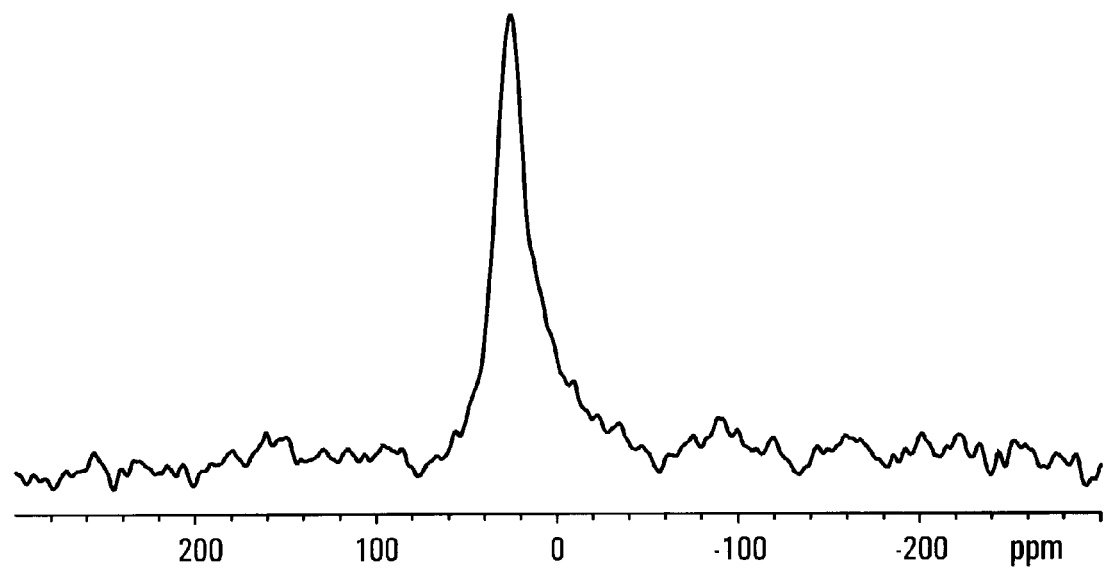
FIG. 10(a) is an $^{15}N\{^1H\}$ CPMAS NMR (cross polarization magic angle spinning nuclear magnetic resonance) spectrum of mesoporous titanium oxide treated with bis (toluene)titanium in the presence of $^{15}N_2$.

To confirm that the nitride in the material originated from dinitrogen, the synthesis was carried out on a high vacuum Schlenk line under a $^{15}$N atmosphere. After three days of stirring to ensure maximum absorption of the nitrogen, the sample was collected by filtration and dried in vacuo. FIG. 10a shows the $^{15}$N-CP MAS spectrum of this labeled material clearly exhibiting a broad resonance at ca. 26 ppm relative to liquid ammonia, consistent with aminoid sp$^3$ hybridized nitrogen.[15] The peak positions are similar to those reported above for mesoporous niobium oxide reduced with bis(toluene)niobium under dinitrogen and differ substantially from those expected for a terminal nitride which can appear as far downfield as +840 ppm relative to nitromethane (+1220 ppm relative to ammonia).[21] There is no clear resonance for the second nitrogen species observed by XPS, either because it is too broad or because it is coincident with the first nitrogen resonance. The activation of dinitrogen by an oxide is extremely rare, normally requiring microwave radiation and argon plasmas.[28-29] The high reactivity of applicant's material may be attributed to low valent, low coordinate Ti centers on the surface of the material formed by the oxidative decomposition of bis (toluene)titanium on the inner and outer surface of the material. Reductive cleavage of dinitrogen by transition metal complexes is rare, however the cleavage of dinitrogen by sterically shielded low coordinate d$^3$ Mo(III) centers proceeds smoothly at room temperature.[21] Since Ti(II) does not have enough electrons to reduce dinitrogen, several adjacent Ti centers must be involved in this process. Many electropositive metals form a thin coating of nitride on the surface upon exposure to air, but these materials are notoriously inert to further reaction of the nitride functionality.

Figure 10B:
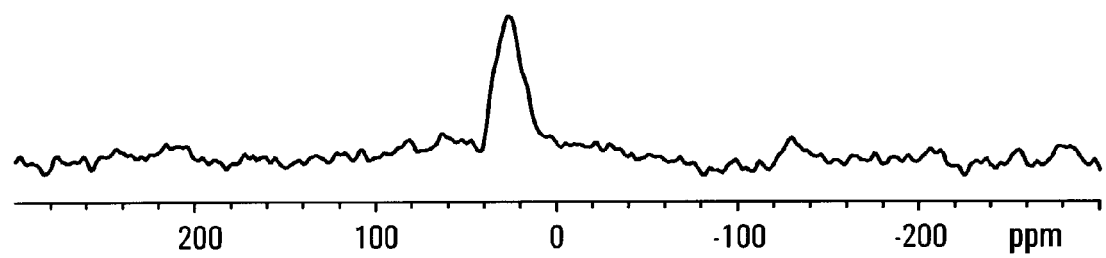
FIG. 10(b) is an $^{15}N\{^1H\}$ MAS NMR spectrum of the same sample as in FIG. 10(a).

In order to unequivocally characterize the surface nitrogen species, a combination of $^{15}$N{$^1$H} MAS and CPMAS NMR experiments were conducted. The $^{15}$N CP MAS spectrum discussed above is shown in FIG. 10a while the MAS NMR spectra of this material is shown in FIG. 10b. In both cases, the NMR powder patterns are very broad (ranging from 500–700 Hz at half height). Spectra acquired under conditions of cross-polarization have higher signal-to-noise ratio than comparable single pulse 15N MAS NMR spectra, by a factor of ca. 1.5–1.7. The isotropic chemical shifts in each spectrum are approximately 25.6 (0.8) ppm with respect to liquid ammonia.[37] The chemical shift, broad lineshape, and high proton CP efficiency suggest that the $^{15}$N lineshape arises from $^{15}$NH$_3$ groups which are anchored to the surface of the mesostructure. The chemical shift is very close to the shift of 23.8 ppm for the ammonium ion in NH$_4$NO$_3$, suggesting a tetrahedral nitrogen environment, as opposed to free N$_2$ ($\delta_{iso}$($^{15}$N)=310 ppm),[37] TiN ($\delta_{iso}$($^{15}$N)=400 ppm)[38] or other oxidized nitrogen species. The broad lineshape arises from a distribution of chemical shifts due to the physisorbed NH$_3$ on the disordered surface of the mesoporous titanium oxide. If the surface-bound ammonia has a strong binding interaction with a paramagnetic niobium atom, it is possible that some of the unpaired electron spin density may be distributed within the molecular orbitals of the ammonia species. The result would be a significant change in $^{15}$N chemical shift or broadening (inhomogeneous and/or homogeneous) of the $^{15}$N NMR resonances. The observed resonances are not unusually shifted away from the typical range of $^{15}$N chemical shifts for ammonia species, nor do they possess large spinning sideband manifolds indicating a large Knight shift anisotropy; thus, if there is a contribution from unpaired electrons in the lattice to the $^{15}$N NMR spectra, it is likely very small, and difficult to distinguish from the inhomogeneous line broadening caused by a distribution of chemical shifts in the disordered sample. The fact that the NH$_3$ is anchored to the surface in this case results in $^{15}$N CPMAS NMR spectra that would not be observed if the NH$_3$ was isotropically tumbling away from the titania surface. Virtually identical NMR spectra have been reported for the absorption of NH$_3$ on the surface of TiO$_2$-supported V$_2$O$_5$ catalysts.[39]

Figure 10C:
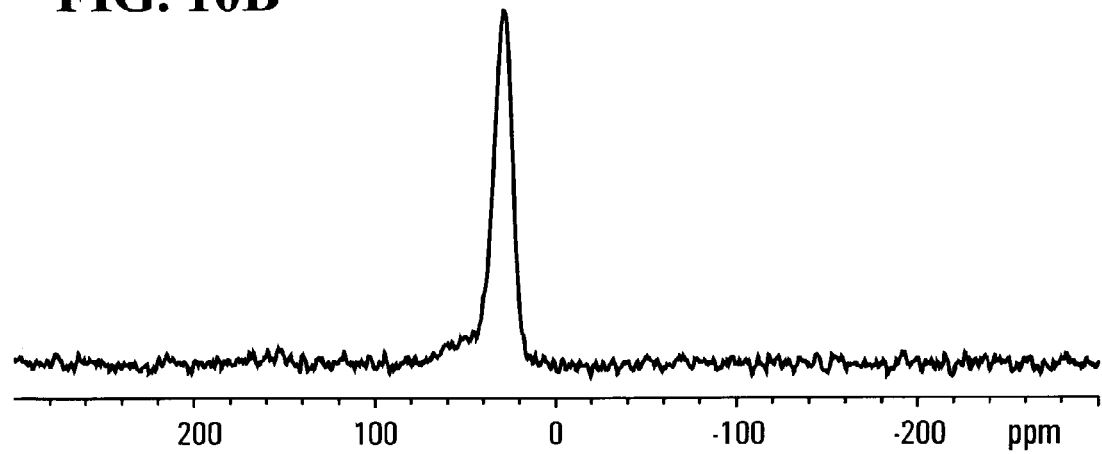
FIG. 10(c) is an $^{15}N\{^1H\}$ CPMAS NMR spectrum of the sample of FIG. 10(a) exposed to air.
Figure 10D:
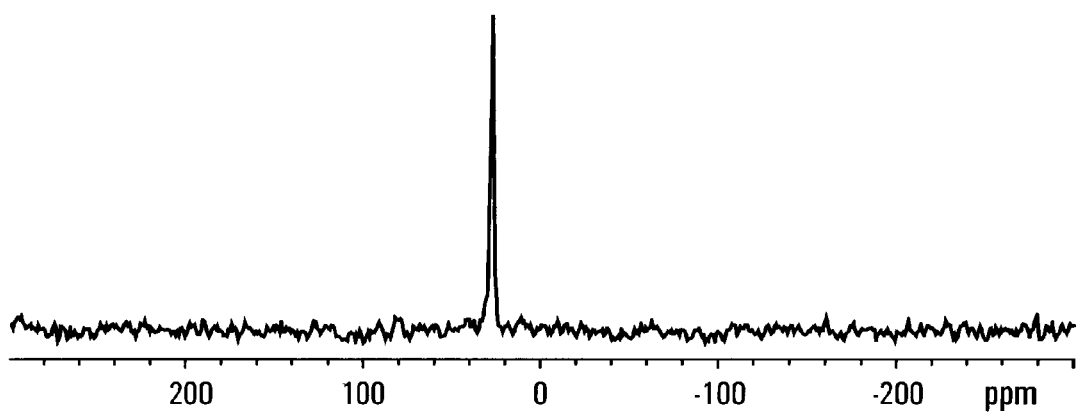
FIG. 10(d) is an $^{15}N\{^1H\}$ MAS NMR spectrum of the sample of FIG. 10(a) exposed to air and treated with $H_2O$.
Figure 10E:
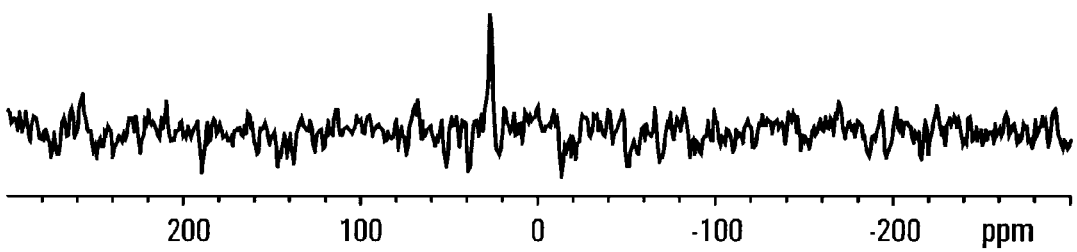
FIG. 10(e) is an $^{15}N\{^1H\}$ CPMAS NMR spectrum of an air-exposed sample of FIG. 10(a) exposed to air and treated with $H_2O$.

NMR spectra of a $^{15}$N$_2$-treated sample exposed to varying degrees of air and moisture are compared in FIGS. 10c, 10d and 10e. In the $^{15}$N CPMAS NMR spectrum (FIG. 10c) of the sample exposed only to air, a familiar broad peak is centered at 26.5 (1.0) ppm with a slightly reduced linewidth of 400 Hz compared to the original samples. There is also a broad tail on the peak in the high frequency direction, suggesting perhaps that a minor reaction has taken place. The XPS of this material shows a slight reduction of the emission at lower binding energy in the N 1s region and an increase of the emission at 399.8 eV. The IR spectrum of this material shows a slight increase in intensity of the absorbance at 3180 cm$^{-1}$. Again, the high CP efficiency, chemical shift and the broad lineshape imply that the ammonia species remains physisorbed on the titania surface. $^{15}$N MAS NMR spectra (FIG. 10d) of the sample treated with air and then excess moisture by vapor diffusion over several days reveal a very sharp peak with $\delta_{iso}$($^{15}$N)=27.1 (0.2) ppm and a much reduced linewidth of ca. 80 Hz. The N 1s region of the XPS spectrum shows only the emission at 399.8 eV, while the IR spectrum shows a further increase in the intensity of the absorbance at 3180 cm$^{-1}$. $^{15}$N CPMAS NMR spectra (FIG. 10e) acquired with various contact times and pulse delays have very poor signal-to-noise ratio in comparison to corresponding MAS NMR spectra. This is further evidence that $^{15}$NH$_3$ has been produced at the titania surface after treatment with $^{15}$N$_2$, since surface $^{15}$NH$_3$ will react with water to form ammonium ions which are not physisorbed to the surface, and therefore not as amenable to cross polarization as surface-anchored NH$_3$. In addition, the loss of the broad lineshape indicates that the nitrogen species are undergoing rapid isotropic motion.

Figure 11A:
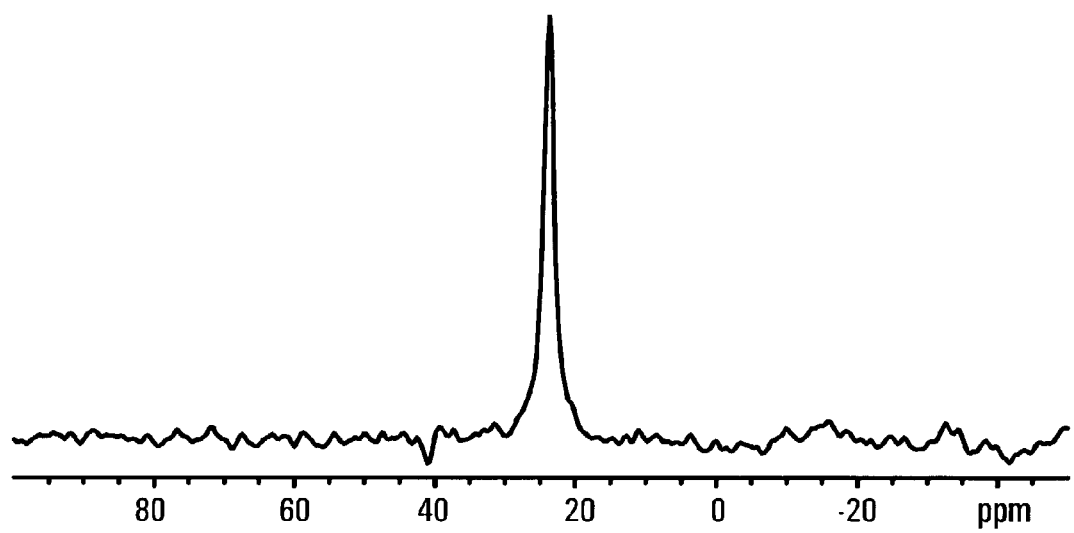
FIGS. 11(a) and (b) are $^{15}N\{^1H\}$ MAS and $^{15}N\{^1H\}$ CPMAS NMR spectra, respectively, of mesoporous titanium oxide treated with $^{15}NH_4NO_3$ (aq.).
Figure 11B:
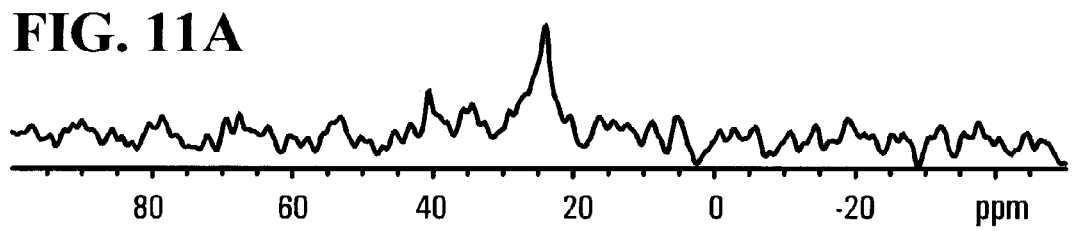
FIGS. 11(c) and (d) are $^{15}N\{^1H\}$ MAS and $^{15}N\{^1H\}$ CPMAS NMR spectra, respectively, of mesoporous titanium oxide treated with $^{15}NH_3$; peak devolution is shown for FIGS. 11(c) and (d).
Figure 11C:
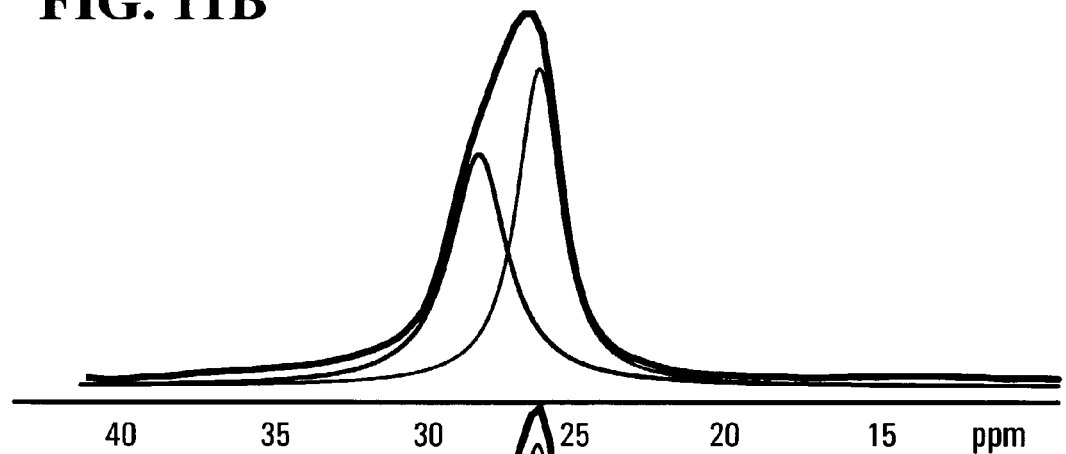
Figure 11D:
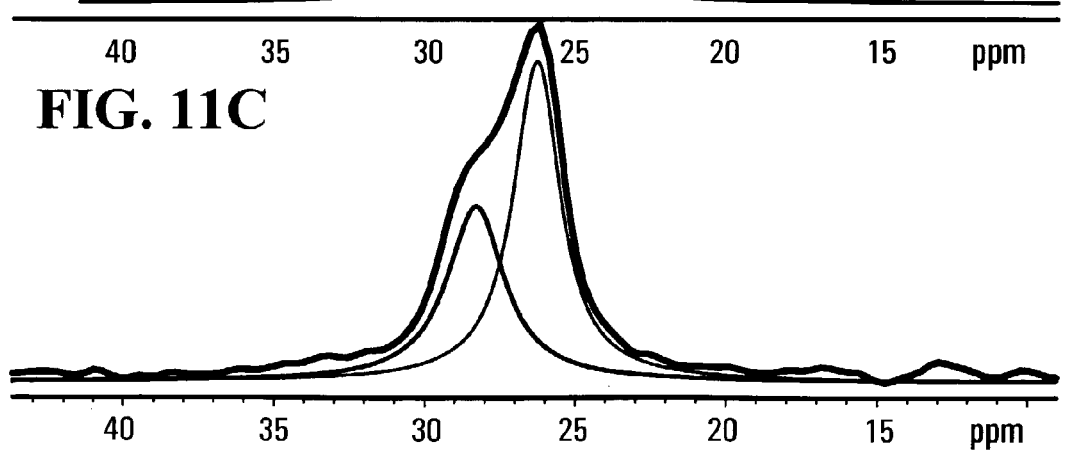
Figure 12:
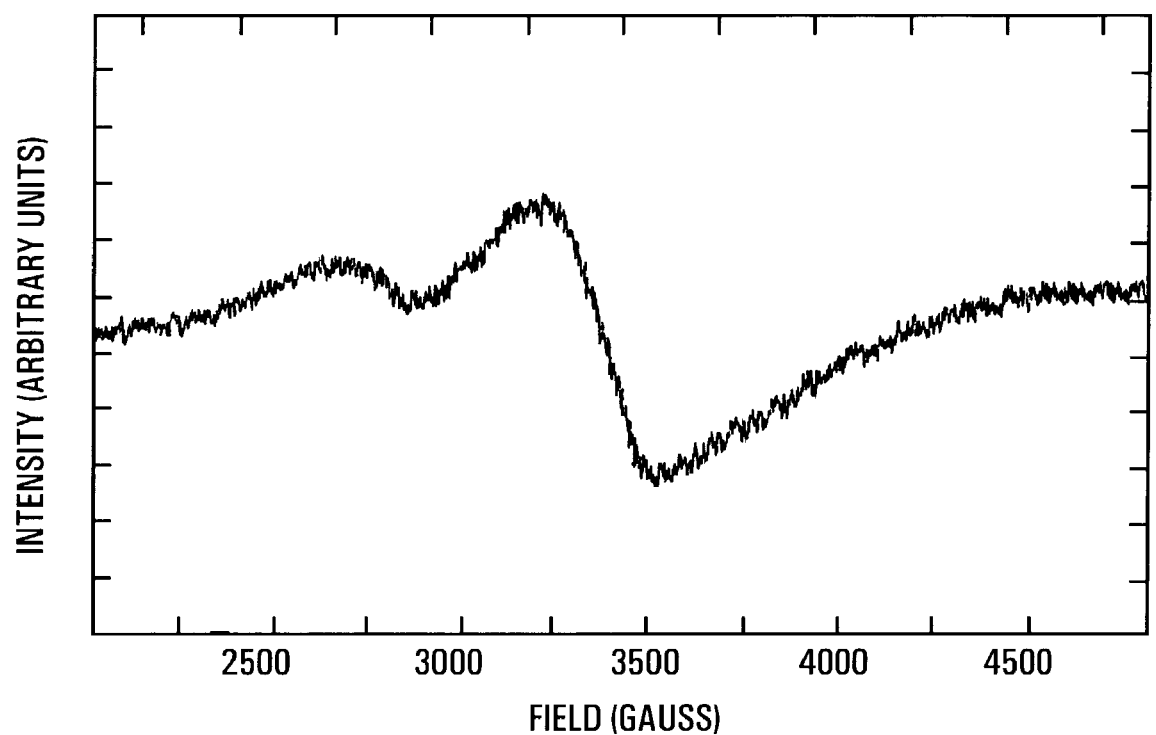
FIG. 12 is an electron spin resonance (ESR) spectrum of titanium dioxide treated with bis(toluene)titanium.
Figure 13A:
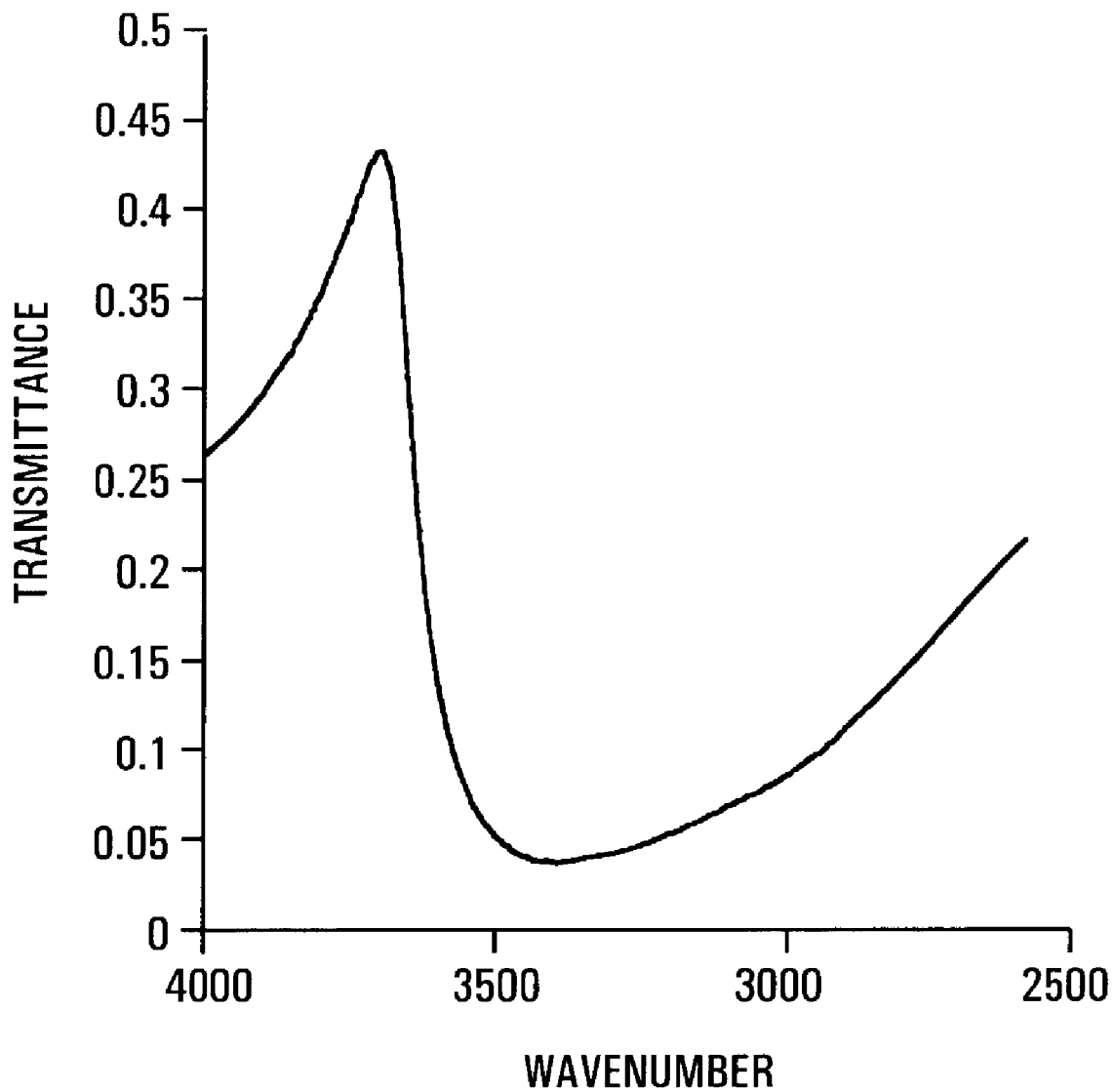
FIG. 13 are infrared spectra (IR) of (a) untreated mesoporous titanium oxide; (b) mesoporous titanium oxide treated with bis(toluene)titanium in the presence of dinitrogen; (c) a sample from FIG. 13(b) treated with excess $H_2O$; and (d) mesoporous titanium oxide treated with ammonia vapor.
Figure 13B:
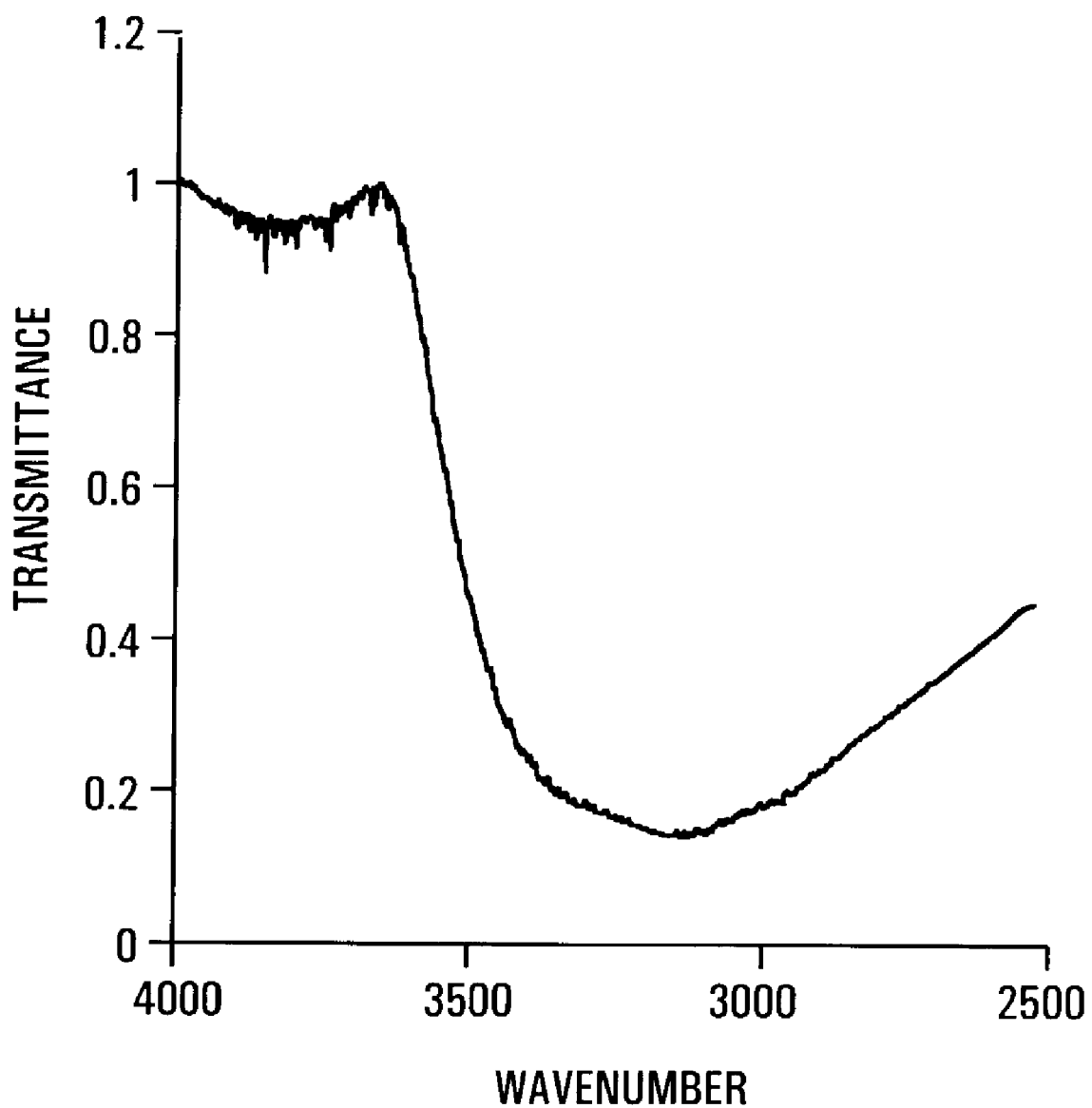
Figure 13C:
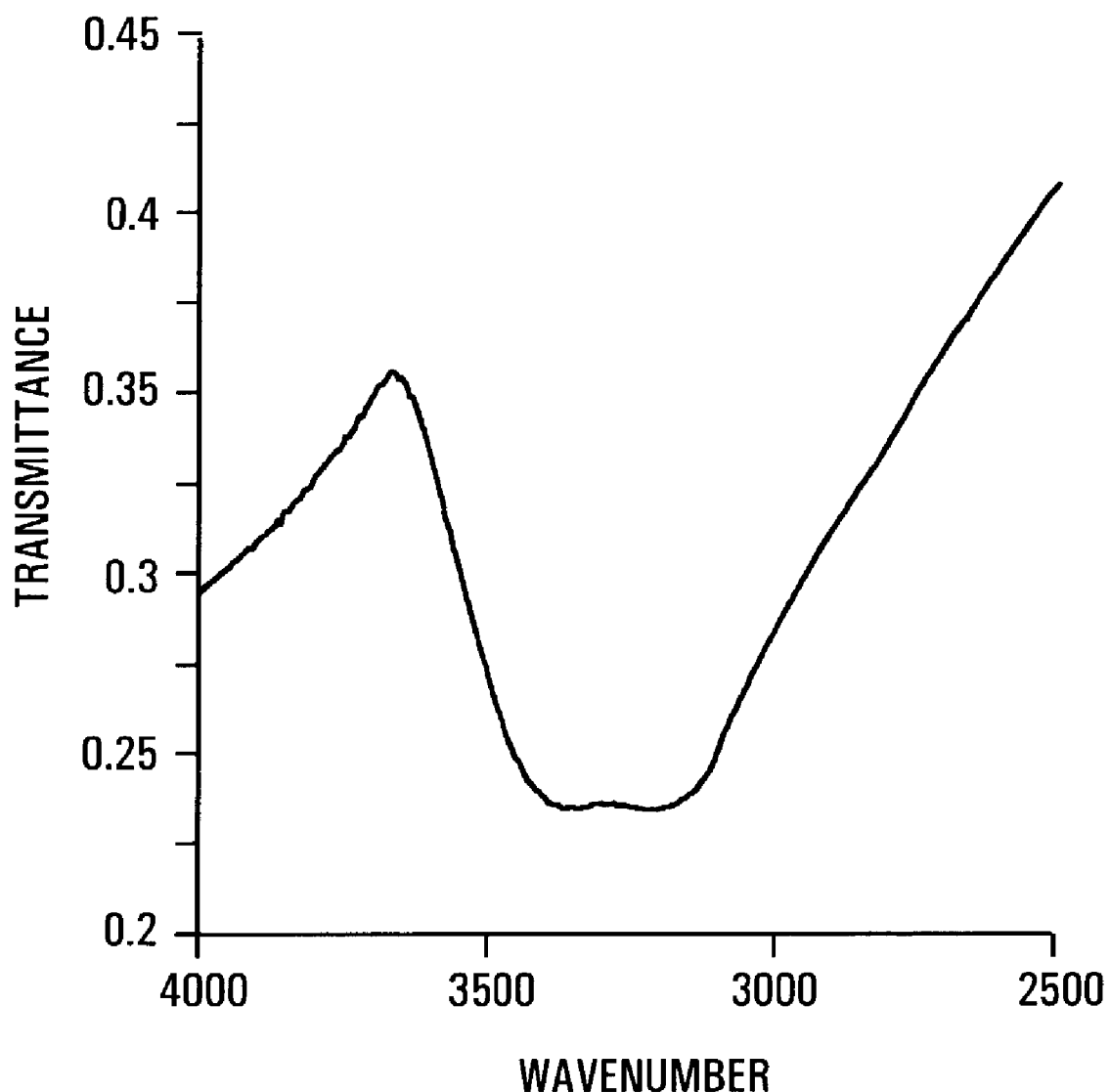
Figure 13D:
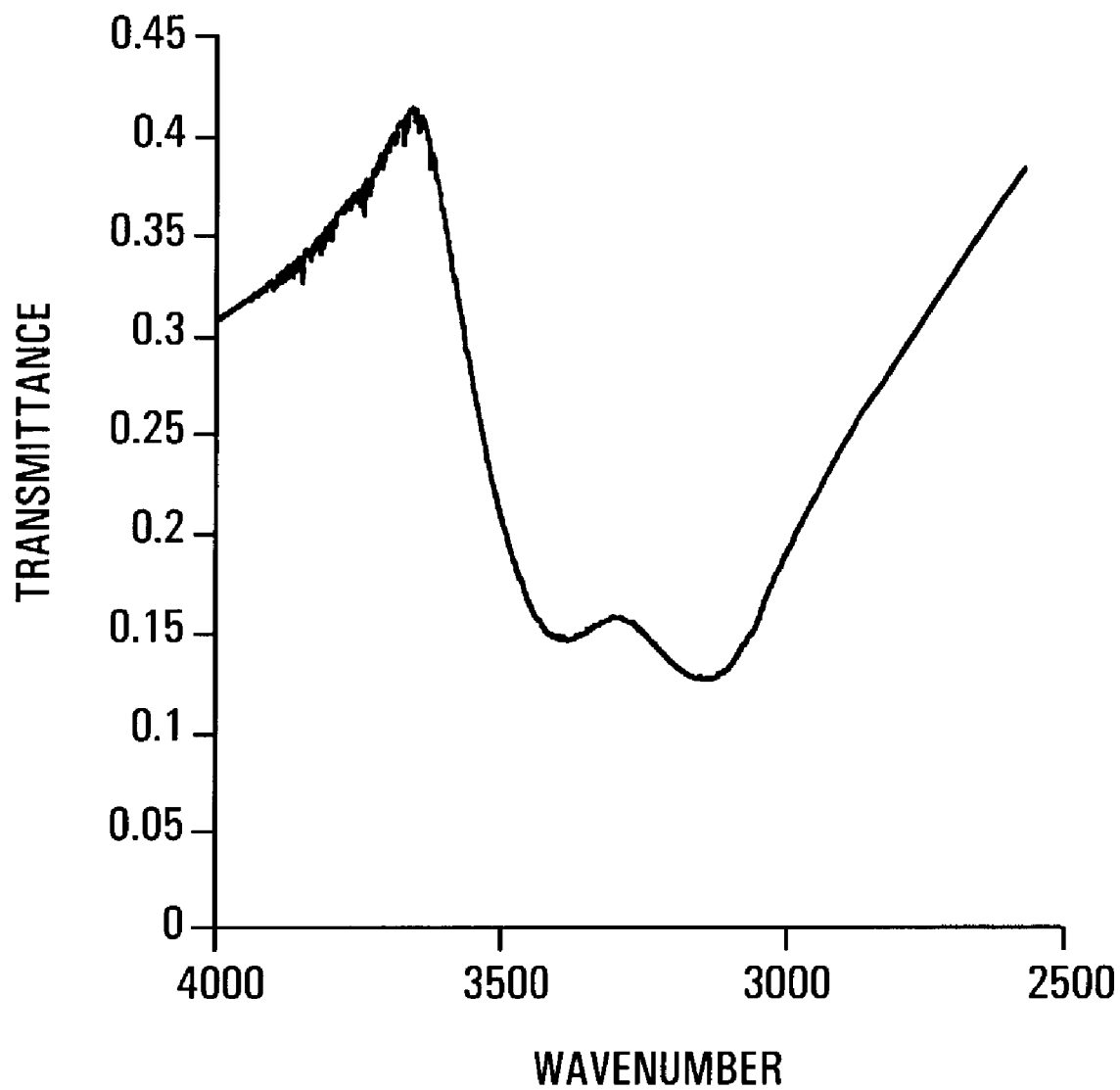

In order to further prove the hypothesis regarding formation of surface NH$_3$ after treatment with N$_2$ and reaction with nascent protons, mesoporous titanium oxide materials were treated with isotopically enriched $^{15}$NH$_3$ and $^{15}$NH$_4$NO$_3$. The presence of surface N—H species was confirmed by the presence of a broad IR absorbance centered at 3180 cm$^{-1}$. The XPS spectrum of these materials was in complete accord to those published previously, displaying emissions in the N 1s region at 402.3 eV for ammonium and 399.9 eV (only in the sample treated with NH$_3$) for surface ammonia corresponding to values previously quoted for adsorbed ammonia on a titania surface.[34] $^{15}$N{$^1$H} MAS and CPMAS NMR spectra are shown in FIG. 11. The $^{15}$N{$^1$H} MAS NMR spectrum for titanium oxide treated with $^{15}$NH$_4$NO$_3$ (FIG. 11a) has a single intense narrow peak (FWHH=50 Hz) with $\delta_{iso}$($^{15}$N)=22.4 (0.2) ppm, suggesting the presence of free $^{15}$NH$_4^+$ ions. The corresponding $^{15}$N{$^1$H} CPMAS NMR spectrum (FIG. 11b) shows very poor cross-polarization efficiency, which is consistent with isotropic tumbling of the $^{15}$NH$_4^+$ ions. $^{15}$N{$^1$H} MAS and CPMAS NMR spectra (FIGS. 11c and 11d, respectively) of $^{15}$NH$_3$-treated titania both have broad peaks by comparison (ca. 110–130 Hz), with $\delta_{iso}$=26.3 (0.5) ppm. Compared to the sample treated with $^{15}$NH$_4$NO$_3$, the peaks are broadened by an inhomogeneous chemical shift distribution and increased CP efficiency is observed in the $^{15}$N CPMAS NMR spectrum. However, the CP efficiency is less than observed for the original $^{15}$N$_2$-treated mesoporous titanium oxide samples (see FIGS. 10a, 10b). Deconvolution of the peaks in FIGS. 11c and 11d gives two peaks at 28.3 and 26.3 ppm in a 1:1 and 3:2 ratio, respectively, for the Lewis and Brønsted adsorption sites discussed above. The slightly different shift for the Brønsted sites with respect to the sample loaded with $^{15}$NH$_4$NO$_3$ can possibly be accounted for by the different degrees of hydrogen bonding of the ammonia species expected in the two samples.

These NMR studies unequivocally prove that surface ammonia species are present in the materials. The conversion of dinitrogen to ammonia in this system most likely occurs by cleavage of dinitrogen by low valent Ti centers on the surface of the mesostructure followed by reaction with water embedded beneath the surface which slowly diffuses to the surface of the pore channels. Treatment of this material with excess H$_2$O leads to disappearance of the XPS N 1s emission at lower binding energy due to the nitride and an increase in the emission due to surface ammonia, effectively completing the hydrolysis of the nitride precursor. Only the materials isolated prior to treatment with moisture display metallic behavior, indicating that much of the surface Ti is still in the reduced form after the initial reaction with dinitrogen. It is anticipated that the metallic properties of the surface will facilitate electron transport processes involved in such a process, and that the high porosity and ease of desorption of the surface ammonia demonstrated by the NMR studies in this report, will be highly advantageous in terms of substrate and product diffusion.

Treatment of mesoporous titanium oxide with bis(toluene)titanium in the presence of ambient nitrogen leads to a low valent metallic mesostructure with observation of surface ammonia species as confirmed by XPS, IR, and NMR. The formation of ammonia likely proceeds by cleavage of dinitrogen by a low-valent Ti species followed by reaction with moisture diffusing from beneath the surface of the structure. The high porosity and facile electron transport properties of this material make it an ideal candidate for a catalytic support material for nitrogen reduction with and incorporation reactions. Although water is not expected to be a part of a viable catalytic process, the use of hydrogen as a reductant in these reactions would certainly be feasible.

It should be noted that the air sensitivity of the solids obtained in Examples 1 and 2, is not a problem as in any catalytic converter of N$_2$ and H$_2$ to NH$_3$, the solid would only be exposed to N$_2$, H$_2$ and NH$_3$. Furthermore, those skilled in the art will be able to determine means and methods most suitable for each use of the air sensitive materials of the present invention.

In the Above:

Materials: All chemicals unless otherwise stated were obtained from Aldrich. Silver paste was obtained from Alfa-Aesar. The solvent was removed in vacuo and replaced with dry, degassed THF. Samples of mesoporous titanium oxide (Ti-TMS1) were obtained from Alfa-Aesar and used without further purification. Mesoporous titanium oxide samples were dried at 150° C. overnight under vacuum and then treated with trimethylsilylchloride in diethylether at room temperature for 4 h. Bis(toluene)titanium was prepared by metal vapor synthesis with the assistance of Professor F. G. N. Cloke at the University of Sussex.[24] Labeled $^{15}$N$_2$ was obtained from Cambridge Isotopes and used without further purification.

Methods: Nitrogen adsorption and desorption data were collected on a Micromeritics ASAP 2010. XRD patterns (CuK$_\alpha$) were recorded in a sealed glass capillary on a Siemens D-500 θ–2θ diffractometer. All XPS data were obtained with a Physical Electronics PHI-5500 spectrometer using charge neutralization. All emissions were referenced to the Carbon C—(C,H) peak at 284.8 eV. The room temperature resistivity measurements were recorded on a Jandel 4 point universal probe head combined with a Jandel resistivity unit. The equation used for calculating the resistivity was:

$$\rho = 2\pi(S)\frac{V}{I}$$

where ρ=resistivity $$\frac{\pi}{\log n^2} =$$

sheet resistivity; V=volts; I=current; t=thickness of the pellet; S=the spacing of the probes (0.1 cm). Variable temperature resistivity measurements were done by pressing pellets of the material and affixing four copper wires with conducting silver paste, followed by coating the ensemble with epoxy resin. The EPR samples were prepared under vacuum and the data collected on a Bruker X-band ESP 300E EPR spectrometer. Variable temperature conductivity and magnetic measurements were conducted on a Quantum Design SQUID magnetometer MPMS system with a 5 Tesla magnet. All elemental analysis data (conducted under an inert atmosphere) were obtained from Galbraith Laboratories, 2323 Sycamore Drive, Knoxville, Tenn. 37921–1700. Solid-state $^{15}$N MAS and CPMAS NMR experiments were conducted at $\nu_0$=40.5 MHz (9.4 T) on a Varian Infinity Plus wide-bore NMR spectrometer at room temperature. All of the samples were powdered and packed into 4 mm o.d. (outside diameter) zirconium oxide rotors, with a specially constructed air-tight Teflon™ cap used for air sensitive materials. The spinning frequencies of both MAS and CPMAS experiments were 5 kHz and a high-power broadband $^1$H decoupling field of 62.5 kHz was applied. All $^{15}$N NMR spectra were referenced with respect to liquid $NH_3$ (20° C.), $\delta_{iso}$=0.0 ppm, by setting the isotropic ammonium $^{15}$N NMR peak of crystalline $^{15}NH_4^{15}NO_3$ to 23.8 ppm.[37] For the CP experiments, the optimized contact times ranged from 3 to 9 ms. The 90° pulses used in the $^{15}$N experiments ranged from 3.4 to 4.4 μs, with an applied rf field of $\nu_1$=55–74 kHz. $^{15}$N CPMAS NMR spectra were acquired with ca. 200–2000 scans, and MAS NMR experiments with 200–1000 scans. All IR spectra were aquired from KBr pellets and recorded on a Bruker Vector 22 IR spectrometer.

Synthesis: Excess bis(toluene)titanium, as calculated on the basis of metal percent derived from the elemental analysis data, was added a suspension of mesoporous titanium oxide in dry toluene under nitrogen. The mesoporous solid immediately went from a light faun color to a deep blue-black. After one day of additional stirring to ensure complete absorption of the organometallic, the reduced material was collected by suction filtration under nitrogen and washed several times with toluene. The resulting blue-black material was dried in vacuo at $10^{-3}$ torr on a Schlenk line until all condensable volatiles had been removed. Samples of mesoporous titanium oxide treated with ammonia or ammonium for use as spectroscopic references were prepared by vapor diffusion or solution impregnation in methanol/water.

EXAMPLE 3

The procedures of Examples 1 and 2 were repeated using mesoporous tantalum oxide as the non-metallic sieve and bis(toluene)tantalum. The resultant metallic sieve was shown to have picked up a total of 1.82% N as determined by elemental analysis, i.e., the mesoporous tantalum oxide when treated with bis(toluene)tantalum in the presence of $N_2$ produced activated nitrogen.

REFERENCES

1. M. E. Davis, *Nature* 1993, 364, 391.
2. C. T. Kresge, M. E. Leonowicz, W. J. Roth, J. C. Vartuli, J. S. Beck, *Nature* 1992, 359, 710.
3. Q. Huo, D. I. Margolese, U. Ciesla, D. G. Demuth, P. Feng, T. E. Gier, P. Sieger, A. Firouzi, B. F. Chmelka, F. Schuth, G. D. Stucky, *Chem. Mater.* 1994, 6, 1176.
4. C.-Y. Chen, S. L. Burkette, H.-X. Li, M. E. Davis, *Micropor. Mater.* 1993, 2, 17.
5. P. T. Tanev, M. Chibwe, T. J. Pinnavaia, *Nature* 1994, 368, 321.
6. M. Antonietti, B. Berton, C. Geoltner, H. Hentze, *Adv. Mater.* 1998, 10, 154.
7. D. Zhao, J. Feng, Q. Huo, N. Melosh, G. H. Frederickson, B. F. Chmelka, G. D. Stucky, *Science* 1998, 279, 548.
8. B. T. Holland, C. F. Blanford, A. Stein, *Science* 1998, 281, 538.
9. J. E. G. J. Wijnhoven, W. L. Vos, *Science* 1998, 281, 802.
10. A. Imhof, D. J. Pine, *Nature* 1997, 389, 948.
11. D. M. Antonelli, J. Y. Ying, *Angew. Chem. Int. Ed. Engl.* 1995, 34, 2014.
12. K. K. Rangan, S. J. L. Billinge, V. Petkov, J. Heising, M. G. Kanatzidis, *Chem. Mater.* 1999, 11, 2629.
13. J. MacLachlan, N. Coombs, G. A. Ozin, *Nature* 1999, 397, 681.
14. S. Attard, C. G. Göltner, J. M. Corker, S. Henke, R. H. Templer, *Angew. Chem. Int. Ed.* 1997, 36, 1315.
15. D. M. Antonelli, J. Y. Ying, *Angew. Chem. Int. Ed. Engl.* 1996, 35, 426.
16. M. Vettraino, M. Trudeau, D. M. Antonelli, *Adv. Mater.* 2000, 12, 337.
17. S. Murray, M. Trudeau, D. M. Antonelli, *Adv. Mater.* 2000, 12, 1339.
18. B. Ye, M. Trudeau, D. M. Antonelli, *Adv. Mater.* 2001, 13, 29.
19. a) X. He, M. Trudeau, D. M. Antonelli, *Adv. Mater.* 2000, 12, 1036. b) X. He, D. M. Antonelli, *Angew. Chem. Int. Ed.* 2002, 41, 214.
20. Z. R. Tian, J. Y. Wang, N. G. Duan, V. V. Krishnan, S. L. Suib, *Science* 1997, 276, 926.
21. C. E. Laplaza, C. C. Cummins, *Science* 1995, 268, 861.
22. G. L. Leigh, *Acc. Chem. Res.* 1992, 25, 177.
23. M. D. Fryzuk, J. B. Love, S. J. Rettig, V. G. Young, *Science* 1997, 275, 1445.
24. F. G. N. Cloke, *Chem. Soc. Rev.* 1993, 17.
25. P. A. Cox, *The Electronic Structure and Chemistry of Solids*, Oxford University Press, New York 1987.
26. C.-W. Chen, *Magnetism and Metallurgy of Soft Magnetic Materials*, Dover, N.Y. 1986.
27. J. Casanovas, J. M. Ricart, J. Rubjo, F. Illas, J. M. Jimeńez-Mateos, *J. Am. Chem. Soc.* 1996, 118, 8071.
28. R. Niewa, H. Jacobs, *Chem. Rev.* 1996, 96, 2053.
29. R. Niewa, F. J. DiSalvo, *Chem. Mater.* 1998, 10, 2733.
30. J. Kubota, K. Aika, *J. Phys. Chem.* 1994, 98, 11293.
31. J. J. Schneider, *Adv. Mater.* 2001, 13, 529.
32. R. Asahi, T. Morikawa, T. Ohwaki, K. Aoki, Y. Taga, *Science*, 2001, 293, 269.
33. N. C. Saha, H. G. Tompkins, *J. Appl. Phys.* 1992, 72, 3072.
34. C. Guimon, A. Gervasini, A. Auroux, *J. Phys. Chem. B* 2001, 105, 10316.
35. M. Vettraino, M. Trudeau, D. M. Antonelli, *Inorg. Chem.* 2001, 40, 2088.
36. a) X. He, and D. M. Antonelli, *Angew. Chem. Int. Ed.* 2002, 41, 215–229. b) X. He, M. Trudeau, D. M. Antonelli, *Adv. Mater.* 2000, 12, 1036. c) X. He, M. Trudeau, D. M. Antonelli, *Chem. Mater.* 2001, 13, 4808. d) X. He, M. Trudeau, D. M. Antonelli, *Inorg. Chem.* 2001, 13, 2730.
37. (a) S. Hayashi, K. Hayamizu, *Bull. Chem. Soc. Jpn.* 1991, 64, 688. (b) M. Witanowski, L. Stefaniak, G. A. Webb, *Ann. Rep. NMR Spectrosc.* 1993, 25, 1.
38. K. J. D. MacKenzie, R. H. Meinhold, D. G. McGavin, J. A. Ripmeester, I. Moudrakovski, *Solid State Nucl. Magn. Reson.* 1995, 4, 193.
39. S. Hu, T. M. Apple, *J. Catalysis* 1996, 158, 199.

The invention claimed is:
1. A metallic mesoporous transition metal oxide molecular sieve (metallic sieve), comprising:

(a) a mesoporous transition metal oxide molecular sieve (non-metallic sieve), comprising at least 50 molar % of a transition metal oxide selected from the group consisting of titanium oxide, zirconium oxide, niobium oxide, hafnium oxide, tantalum oxide and a mixture thereof; and (b) at least one transition metal or lanthanide metal deposited in pores of said non-metallic sieve;

wherein the at least one transition metal or lanthanide metal when deposited is in a lower oxidation state than the inner walls of the pores of the non-metallic sieve such that oxidation of the deposited transition metal or lanthanide metal by the inner walls occurs, resulting in a metallic sieve.

2. A metallic sieve according to claim 1, wherein said non-metallic sieve comprises substantially 100 molar % of one or more of said transition metal oxides.

3. A metallic sieve according to claim 1, wherein the non-metallic sieve comprises at least 50 molar % of the transition metal oxide and a further inorganic oxide or metal salt.

4. A metallic sieve according to claim 3, wherein the further inorganic oxide is a transition metal oxide, a lanthanide group metal oxide, an alkali metal oxide, an alkaline earth metal oxide, an oxide of a main group element of groups IIIA to VIIA of the Periodic Table or a mixture thereof; and the metal salt is a transition metal salt, an alkali metal salt, an alkaline earth metal salt or a mixture thereof.

5. A metallic sieve according to claim 4, wherein the further inorganic oxide is an oxide of Y, V, Ir, Os, Rh, Pt, Pd, Au, Fe, Ru, Re, Cu, Co, Tl, Ni, Cr, Mo, Mn, W or a mixture thereof; and the metal salt is KCl, NaCl or a mixture thereof.

6. A metallic sieve according to claim 2, wherein said non-metallic sieve comprises a single metal oxide.

7. A metallic sieve according to claim 6, wherein the at least one transition metal or lanthanide metal is selected from the group consisting of Ti, V, Zr, Nb, Hf, Ta, Ru, Pd, Pt and a mixture thereof.

8. A metallic sieve according to claim 7, wherein the at least one transition metal is Nb.

9. A metallic sieve according to claim 7, wherein the at least one transition metal is Ti.

10. A metallic sieve according to claim 7, wherein the at least one transition metal is Ta.

11. A metallic sieve according to claim 7, wherein said non-metallic sieve pore size is in the range from about 10 to about 500 Å.

12. A metallic sieve according to claim 11, wherein the total available surface area of said non-metallic sieve, when measured by BET, is in the range from about 50 to 1200 $M^2g^{-1}$.

13. A solid electrolyte comprising a metallic sieve according to claim 1.

14. A hydrogen storage means comprising a metallic sieve according to claim 1.

15. A catalyst comprising a metallic sieve according to claim 1.

16. A catalyst according to claim 15, adapted for catalytic cracking of petroleum feedstocks, hydrocarbon reforming, photocatalytic degradation of organic halides, $NO_x$ decomposition, methane oxidation, olefin reduction, hydroformylation, alkylation, hydrosulfurization, solid acid catalysis or $N_2$ activation.

17. A process for activating $N_2$, comprising contacting $N_2$ with a metallic sieve of claim 7.

18. A process for producing $NH_3$, comprising reacting $N_2$ and $H_2$ in the presence of a metallic sieve of claim 7, and collecting the produced $NH_3$.

19. A process according to claim 18, effected at atmospheric pressure and room temperature.

20. A metallic sieve according to claim 9, wherein said transition metal oxide is titanium oxide.

21. A process for preparing a metallic sieve of claim 21, comprising treating mesoporous titanium oxide with bis(toluene)titanium under a nitrogen atmosphere to produce the metallic sieve of claim 20.

* * * * *

UNITED STATES PATENT AND TRADEMARK OFFICE
CERTIFICATE OF CORRECTION

PATENT NO. : 7,078,130 B2  Page 1 of 1
APPLICATION NO. : 10/302987
DATED : July 18, 2006
INVENTOR(S) : David M. Antonelli It is certified that error appears in the above-identified patent and that said Letters Patent is hereby corrected as shown below:

On page 2, the first column, the last reference listed in the column, "...M. Antonelli..." should read --...M. Antonietti...--; and
On page 2, the second column, the fourth reference listed from the top of the column, "...Feng. Q. Iluo. N. ..." should be --Feng Q. Huo. N. ...--.

Signed and Sealed this

Twenty-third Day of January, 2007

JON W. DUDAS
*Director of the United States Patent and Trademark Office*